US00RE37459B1

(19) United States
(12) Reissued Patent
Ito et al.

(10) Patent Number: US RE37,459 E
(45) Date of Reissued Patent: Dec. 4, 2001

(54) ELECTRONIC MUSICAL INSTRUMENT HAVING A RYHTHM PERFORMANCE FUNCTION

(75) Inventors: Mikio Ito; Masao Kondo; Yasunao Abe, all of Hamamatsu (JP)

(73) Assignee: Yamaha Corporation, Hamamatsu (JP)

(21) Appl. No.: 09/493,518

(22) Filed: Jan. 27, 2000

Related U.S. Patent Documents

Reissue of:
(64) Patent No.: 4,991,486
Issued: Feb. 12, 1991
Appl. No.: 07/291,275
Filed: Dec. 28, 1988

(30) Foreign Application Priority Data

Dec. 30, 1987 (JP) ..... 62-332648
Dec. 30, 1987 (JP) ..... 62-332649
Dec. 30, 1987 (JP) ..... 62-332650
Dec. 30, 1987 (JP) ..... 62-332651

(51) Int. Cl.[7] ..... G10H 1/057; G10H 1/42; G10H 1/46; G10H 7/00

(52) U.S. Cl. ..... 84/611; 84/622; 84/627; 84/633; 84/DIG. 12

(58) Field of Search ..... 84/609–612, 627, 84/633–636, 649–652, 663, 665–668, DIG. 12, 622–625, 659–661

(56) References Cited

U.S. PATENT DOCUMENTS 3,743,757 7/1973 Okamoto .
3,958,483 * 5/1976 Borrevik et al. ..... 84/635
4,114,495 9/1978 Tomisawa .
4,326,441 * 4/1982 Imamura et al. ..... 84/635
4,336,736 * 6/1982 Mishima ..... 84/635
4,387,617 6/1983 Kato et al. .
4,467,690 8/1984 Nishimoto .
4,476,764 * 10/1984 Nishimoto ..... 84/DIG. 12
4,526,080 * 7/1985 Amano ..... 84/635 X
4,554,854 * 11/1985 Kato ..... 84/DIG. 12
4,672,876 6/1987 Sugiyama et al. .
4,685,370 * 8/1987 Okuda et al. ..... 84/635
4,763,554 8/1988 Konzuki .

FOREIGN PATENT DOCUMENTS 48-47823 7/1973 (JP) .
52-025613 2/1977 (JP) .
48515 * 4/1979 (JP) .
54-048515 4/1979 (JP) .
54-48515 4/1979 (JP) .
55-41482 3/1980 (JP) .
55-135899 10/1980 (JP) .
55-143595 11/1980 (JP) .
57-136698 8/1982 (JP) .
58-62696 4/1983 (JP) .
191 * 1/1984 (JP) .

(List continued on next page.)

*Primary Examiner*—Stanley J. Witkowski
(74) *Attorney, Agent, or Firm*—Morrison & Foerster

(57) ABSTRACT

An electronic musical instrument having a rhythm performance function includes a first memory for pre-storing plural rhythm tone kinds, rhythm selecting switches each capable of designating one of said rhythm tone kinds and a rhythm tone generator having plural channels. The selected rhythm tone kind is assigned to each channel of the rhythm tone generator. A rhythm tone corresponding to the selected rhythm tone kind is generated by each channel so that continuous rhythm tones will be generated by plural channels based on time division system. In addition, before playing a rhythm performance, rhythm patterns can be arbitrarily programmed and then stored into a second memory by operating the rhythm selecting switches and other switches corresponding to the predetermined rhythm tones of plural musical instruments. Further, the roll of rhythm tones can be continuously generated, wherein volume information stored in the first memory is determined such that tone volume of the roll of rhythm tones is set smaller than that of the normal rhythm tones.

23 Claims, 15 Drawing Sheets

FOREIGN PATENT DOCUMENTS

| | | | |
|---|---|---|---|
| 59-191 | | 1/1984 | (JP) . |
| 59-3485 | | 1/1984 | (JP) . |
| 18471 | * | 5/1984 | (JP) . |
| 59-18471 | | 5/1984 | (JP) . |
| 60-76797 | | 5/1985 | (JP) . |
| 125699 | * | 8/1985 | (JP) . |
| 60-125699 | | 8/1985 | (JP) . |
| 61-13296 | | 1/1986 | (JP) . |
| 61-99897 | | 6/1986 | (JP) . |
| 116397 | * | 7/1986 | (JP) . |
| 61-116397 | | 7/1986 | (JP) . |
| 61-167995 | | 7/1986 | (JP) . |
| 61-175694 | | 8/1986 | (JP) . |
| 62-2100 | | 1/1987 | (JP) . |
| 62-67596 | | 3/1987 | (JP) . |
| 62-89094 | | 4/1987 | (JP) . |
| 62-103093 | | 7/1987 | (JP) . |
| 62-159189 | | 7/1987 | (JP) . |
| 62-187895 | | 8/1987 | (JP) . |
| 62-52317 | | 11/1987 | (JP) . |
| 62-195190 | | 12/1987 | (JP) . |
| 37395 | * | 7/1988 | (JP) . |
| 63-37395 | | 7/1988 | (JP) . |

* cited by examiner

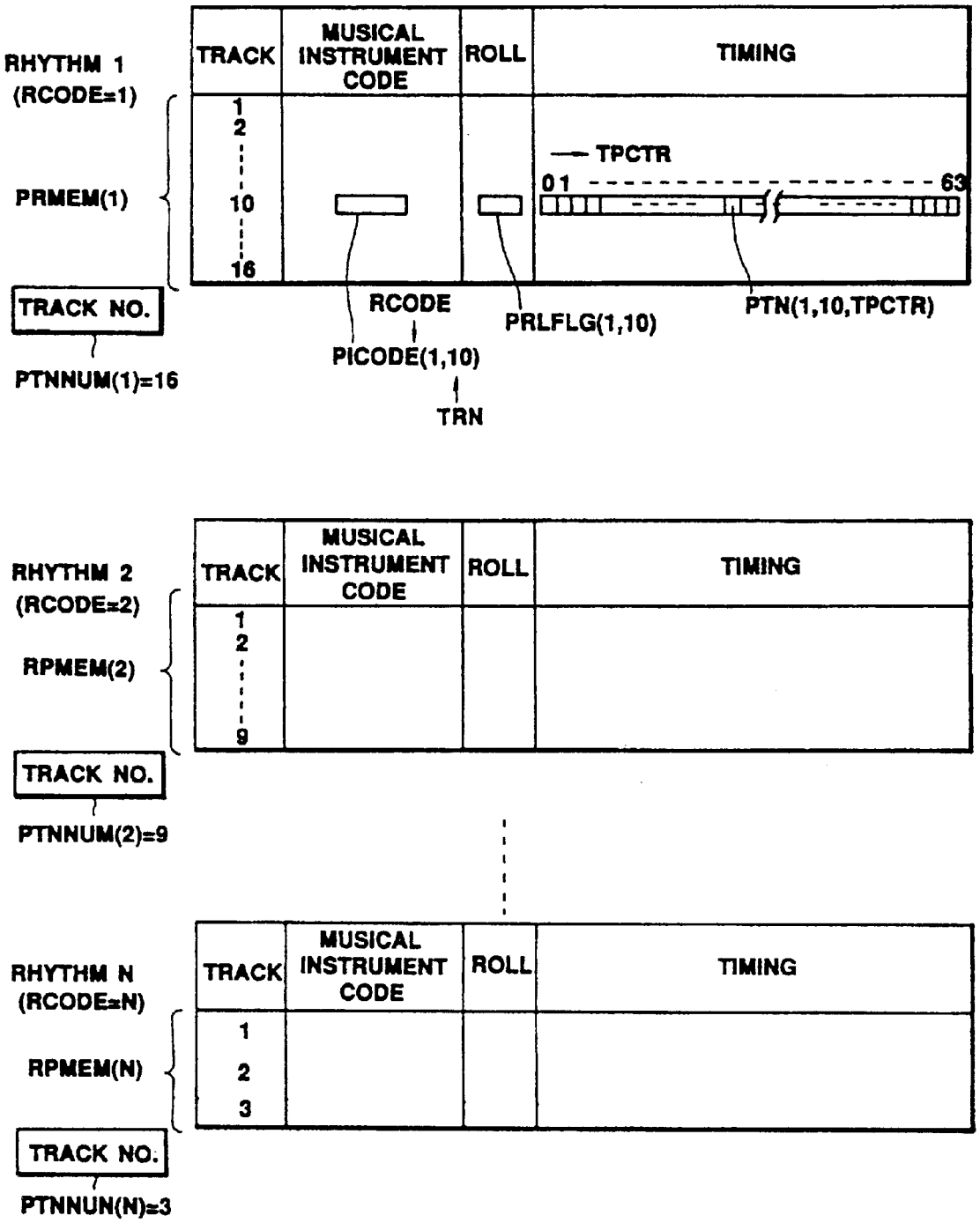
FIG. 3A (STORING CONTENTS OF RHYTHM PATTERN MEMORY)

| | MUSICAL INSTRUMENT 1 | MUSICAL INSTRUMENT 2 | - - - - - - - - - | MUSICAL INSTRUMENT 32 |
|---|---|---|---|---|
| TRUNCATE VALUE | 10 | 14 | | 9 |

FIG.3B (STORING CONTENTS OF TRUNCATE VALUE MEMORY)

| | | MUSICAL INSTRUMENT 1 | MUSICAL INSTRUMENT 2 | - - - - - - - - - | MUSICAL INSTRUMENT 32 |
|---|---|---|---|---|---|
| VOLUME VALUE | NORMAL | 10 | 8 | - - - - - - - - - | 14 |
| | ROLL | 5 | 4 | - - - - - - - - - | 7 |

FIG.3C (STORING CONTENTS OF VOLUME VALUE MEMORY)

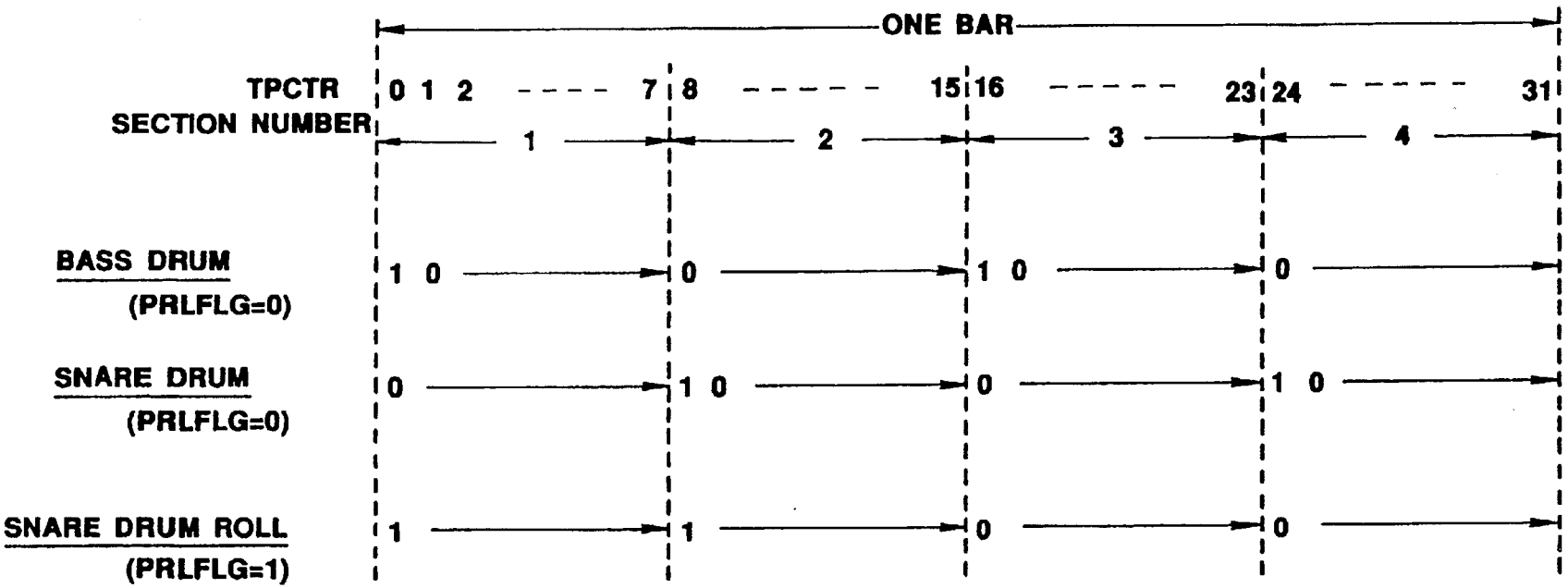
FIG. 4 (EXAMPLE OF TIMING DATA)

(A) RHYTHM PATTERN PROGRAM MEMORY

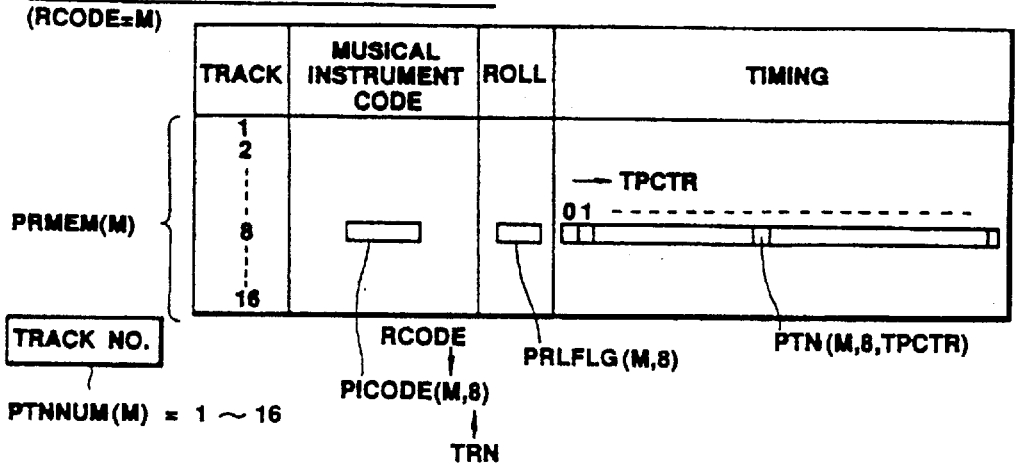

(B) CHANNEL ASSIGNING MEMORY

| CHANNEL | MUSICAL INSTRUMENT CODE | TRUNCATE COUNTER | ROLL FLAG | VOLUME |
|---|---|---|---|---|
| CH1 | ICODE (1) | TCTR (1) | RLFLG (1) | VLM (1) |
| CH2 | ICODE (2) | TCTR (2) | RLFLG (2) | VLM (2) |
| ⋮ | ⋮ | ⋮ | ⋮ | ⋮ |
| CH8 | ICODE (8) | TCTR (8) | RLFLG (8) | VLM (8) |

(C) WORKING MEMORY

| | |
|---|---|
| RCODE | ----- CODE OF OPERATED RSS |
| PDCODE | ----- CODE OF OPERATED PDS |
| TPCTR | ----- TEMPO COUNT VALUE |
| PRGFLG | ----- "1" IN PROGRAM MODE; "0" IN PLAY MODE |
| START | ----- "1" IN RHYTHM RUN; "0" IN STOP |
| RLSW | ----- "1" IN RLS ON; "0" IN RLS OFF |
| TRN | ----- TRACK NUMBER |
| ACH | ----- ASSIGNING CHANNEL NUMBER |
| CHN | ----- CHANNEL NUMBER |
| DTPCTR | ----- PRECEDING TEMPO COUNT VALUE |

FIG. 5 (STORING CONTENTS OF RAM 20)

(MAIN ROUTINE)

(RHYTHM SELECTION SUBROUTINE)

(START/STOP SUBROUTINE)

(MODE SELECTION SUBROUTINE)

(PAD OPERATION SUBROUTINE)

(ASSIGNING CHANNEL DETECTION SUBROUTINE)

(PAD TONE GENERATION PROCESS IN PLAY MODE)

(TEMPO CLOCK INTERRUPT PROCESS)

(TEMPO CLOCK INTERRUPT PROCESS)

(OPERATION OF GENERATING ROLL TONE)

| VALUE OF TPCTR | TLD (○:LIGHT ON) | | | |
|---|---|---|---|---|
| | 1 | 2 | 3 | 4 |
| 0 | ○ | ○ | ○ | ○ |
| 8 | | ○ | | |
| 16 | | | ○ | |
| 24 | | | | ○ |
| 32 | ○ | | | |
| 40 | | ○ | | |
| 48 | | | ○ | |
| 56 | | | | ○ |

(TEMPO INDICATING OPERATION)

(TRUNCATE TIMER INTRARUPUT PROCESS)

(ROLL TIMER INTERRUPT PROCESS)

ELECTRONIC MUSICAL INSTRUMENT HAVING A RYHTHM PERFORMANCE FUNCTION

Matter enclosed in heavy brackets [ ] appears in the original patent but forms no part of this reissue specification; matter printed in italics indicates the additions made by reissue.

*This is a reissue of application Ser. No. 07/291,275 filed Dec. 28, 1988 and now U.S. Pat. No. 4,991,486.*

BACKGROUND OF THE INVENTION

1. Field of the Invention

The present invention relates to an electronic musical instrument having a rhythm performance function, and more particularly to an electronic musical instrument having plural rhythm tone source channels to which rhythm tone kind designating information is applied.

2. Prior Art

The known first conventional rhythm performance apparatus having plural rhythm tone source channels (as disclosed in Japanese Patent Laid-Open Publication No. 59-191) assigns plural rhythm tone kinds to be performed (e.g., rhythm tones of bass drum, cymbal, snare drum, ...) to plural rhythm tone source channels. By selectively driving these rhythm tone source channels in accordance with rhythm patterns concerning the rhythm kind (e.g., march) to be performed, the rhythm performance is automatically done.

However, the above-mentioned first conventional rhythm performance apparatus is disadvantageous in that the rhythm kinds to be performed must be fixed. For example, when the conventional rhythm performance apparatus provides eight rhythm tone source channels, the number of rhythm tones to be generated must be fixed at eight. In such case, it is impossible to use sixteen rhythm tone kinds (which is larger than the number of channels) and thereby do the rhythm performance whose contents is complicated and variable.

In order to do such complicated rhythm performance in the conventional rhythm performance apparatus, the number of channels must be increased, so that its constitution must be complicated.

As the second conventional rhythm performance apparatus, a rhythm pattern program apparatus (as disclosed in Japanese Patent Laid-Open Publication No. 54-48515) is known. This apparatus provides recording means having plural recording tracks each corresponding to each of plural rhythm tone kinds, wherein tone-generation timing information is written into each recording track.

In order to program many kinds of rhythm patterns (or many rhythm kinds) such as the march, waltz, rumba and the like, the above-mentioned second conventional apparatus must provide thirty-two recording tracks if thirty-two rhythm tone kinds are used, for example. For this reason, the second conventional apparatus is disadvantageous in that the memory having large memory capacity must be required as the recording means.

As the third conventional rhythm performance apparatus, the rhythm performance apparatus as disclosed in Japanese Utility Model Publication No. 59-18471 is known.

In the above-mentioned third conventional rhythm performance apparatus, each rhythm tone kind corresponds to each rhythm tone source channel. Hence, in order to increase the number of rhythm tone kinds which can be generated, the number of rhythm tone source channels must be increased, so that the third conventional rhythm performance apparatus is disadvantageous in that its constitution must be complicated.

In order to eliminate the above disadvantage, it can be considered that plural rhythm tone kinds are assigned to each rhythm tone source channel. For example, sixteen rhythm tone kinds are assigned to eight rhythm tone source channels. However, in the case where the rhythm tones in eight channels are all generated, it is impossible to simultaneously generate a new rhythm tone. For this reason, the third conventional rhythm performance apparatus is disadvantageous in that performance expression must be limited in the rhythm performance having high speed tempo or in the rhythm tone generation with short time interval.

As the fourth conventional rhythm performance apparatus, a manual rhythm (or hand-percussion) performance apparatus as disclosed in Japanese Utility Model Laid-Open Publication No. 61-116397 is known. This apparatus can generate a single rhythm tone corresponding to the selected rhythm tone kind at every time when an operable member corresponding to a specific rhythm tone kind is operated.

However, in order to generate a drum tone as a roll tone (i.e., continuous tone) in the above apparatus, a player must continuously turn on and off the operable member corresponding to such drum tone. For this reason, this fourth conventional rhythm performance apparatus is disadvantageous in that its operation is very troublesome.

SUMMARY OF THE INVENTION

It is therefore a primary object of the present invention to provide an electronic musical instrument having a rhythm performance function whose number of channels is relatively small but which can do the variable rhythm performance.

It is another object of the present invention to provide an electronic musical instrument having a rhythm performance function capable of programming many kinds of rhythm patterns in the recording means having relatively small memory capacity.

It is still another object of the present invention to provide an electronic musical instrument having a rhythm performance function capable of generating many kinds of musical tones in short time without increasing the number of channels.

It is a further object of the present invention to provide an electronic musical instrument having a rhythm performance function capable of generating the roll tone with ease.

In a first aspect of the invention, there is provided an electronic musical instrument having a rhythm performance function comprising:

(a) tone source means having plural rhythm tone source channels, the tone source means storing plural rhythm tone kinds each of which can be designated by a player, the tone source means thereby generating a rhythm tone signal corresponding to designated rhythm tone kind by each rhythm tone source channel;

(b) means for generating rhythm tone kind designating information by which at least one of rhythm tone kinds to be performed is designated by every tone-generation timing; and (c) assigning means for assigning the rhythm tone kind designating information to one of the plural rhythm tone source channels so that desirable rhythm tone kind is designated in assigned rhythm tone source channel at every time when the means generates the rhythm tone kind designating information.

In a second aspect of the invention, there is provided an electronic musical instrument having a rhythm performance function comprising:

(a) storing means having plural storing tracks;

(b) selecting means for arbitrarily selecting one of plural rhythm tone kinds concerning rhythm patterns to be programmed, so that the selecting means generates rhythm tone kind designating information by which selected rhythm tone kind is designated;

(c) designating means for designating a tone-generation timing concerning the rhythm tone kind selected by the selecting means, so that the designating means generates timing information indicative of designated timing thereof; and (d) writing means for detecting the storing track to which the rhythm tone kind designating information have been already assigned to thereby write corresponding timing information to the detected storing track at every time when the selecting means generates the rhythm tone kind designating information, the writing means assigning the rhythm tone kind designating information to one of un-assigned storing tracks to thereby write corresponding timing information to the newly assigned storing track when the rhythm tone kind designating information is not assigned to the plural storing tracks at all.

In a third aspect of the invention, there is provided an electronic musical instrument having a rhythm performance function comprising:

(a) tone source means having plural musical tone generating channels, the tone source means generating a musical tone signal corresponding to designated at least one of plural musical tone kinds by each musical tone generating channel;

(b) designating means for generating musical tone kind designating information by which the musical tone kind to be generated is designated;

(c) assigning means for assigning the musical tone kind designating information to at least one of the plural musical tone generating channels so that the musical tone kind corresponding to the musical tone kind designating information is designated in the assigned musical tone generating channel at every time when the designating means generates the musical tone kind designating information;

(d) storing means for storing truncate control information corresponding to a tone-generation period of each musical tone kind;

(e) measuring means for measuring a tone-generation remaining time of the musical tone which is generating based on the truncate control information by each musical tone generating channel to which the musical tone kind designating information is assigned by the assigning means; and (f) control means for controlling channel assignment of the assigning means based on the tone-generation remaining time which is measured by the measuring means, whereby new musical tone kind designating information is assigned to certain musical tone generating channel whose tone-generation remaining time is zero or minimum within the plural musical tone generating channels.

In a fourth aspect of the invention, there is provided an electronic musical instrument having a rhythm performance function comprising:

(a) tone-generation designating means for generating tone-generation designating information with respect to a specific rhythm tone kind;

(b) roll designating means for generating roll designating information;

(c) rhythm tone source means capable of generating a rhythm tone signal corresponding to the rhythm tone kind; and (d) control means for controlling the rhythm tone source means based on the tone-generation designating information and the roll designating information, whereby the rhythm tone signal is generated singly when the tone-generation designating information is only generated, while the rhythm tone signal is continuously generated by every predetermined time interval when both of the tone-generation designating information and the roll designating information are simultaneously generated.

In a fifth aspect of the invention, there is provided an electronic musical instrument having a rhythm performance function comprising:

(a) memory means for pre-storing at least plural rhythm tone kinds which are predetermined or programmed in advance;

(b) rhythm selecting means for selecting one of the plural rhythm tone kinds to thereby generate rhythm tone kind designating information representative of selected rhythm tone kind;

(c) rhythm tone generating means having plural channels; and (d) assigning means for assigning the rhythm tone kind designating information to one of the plural channels, so that the rhythm tone generating means generates a rhythm tone signal corresponding to selected rhythm tone kind, the rhythm tone signal driving an external sound system so that rhythm tones of the plural rhythm tone kinds can be generated based on time division system.

In a sixth aspect of the invention, there is provided an electronic musical instrument having a rhythm performance function comprising:

(a) memory means for storing at least plural rhythm tone kinds;

(b) a panel unit providing at least rhythm selecting switches so that one of the plural rhythm tone kinds is arbitrarily selected by operating one of the rhythm selecting switches;

(c) a keyboard;

(d) a rhythm tone generator having plural channels each of which is assigned with the rhythm tone kind, the rhythm tone generator generating a rhythm tone signal corresponding to selected rhythm tone kind by each channel;

(e) a keyboard tone generator for generating a musical tone signal based on performance of the keyboard; and (f) means for generating a musical tone and a rhythm tone respectively based on the rhythm tone signal and the musical tone signal.

BRIEF DESCRIPTION OF THE DRAWINGS

Further objects and advantages of the present invention will be apparent from the following description, reference being had to the accompanying drawings wherein a preferred embodiment of the present invention is clearly shown.

In the drawings:

FIGS. 3A to 3C are drawings showing storing contents of ROM shown in FIG. 1;

FIG. 4 is a drawing showing an example of timing data;

FIGS. 5(A) to 5(C) are drawings showing storing contents of RAM shown in FIG. 1;

DESCRIPTION OF A PREFERRED EMBODIMENT

Figure 1:
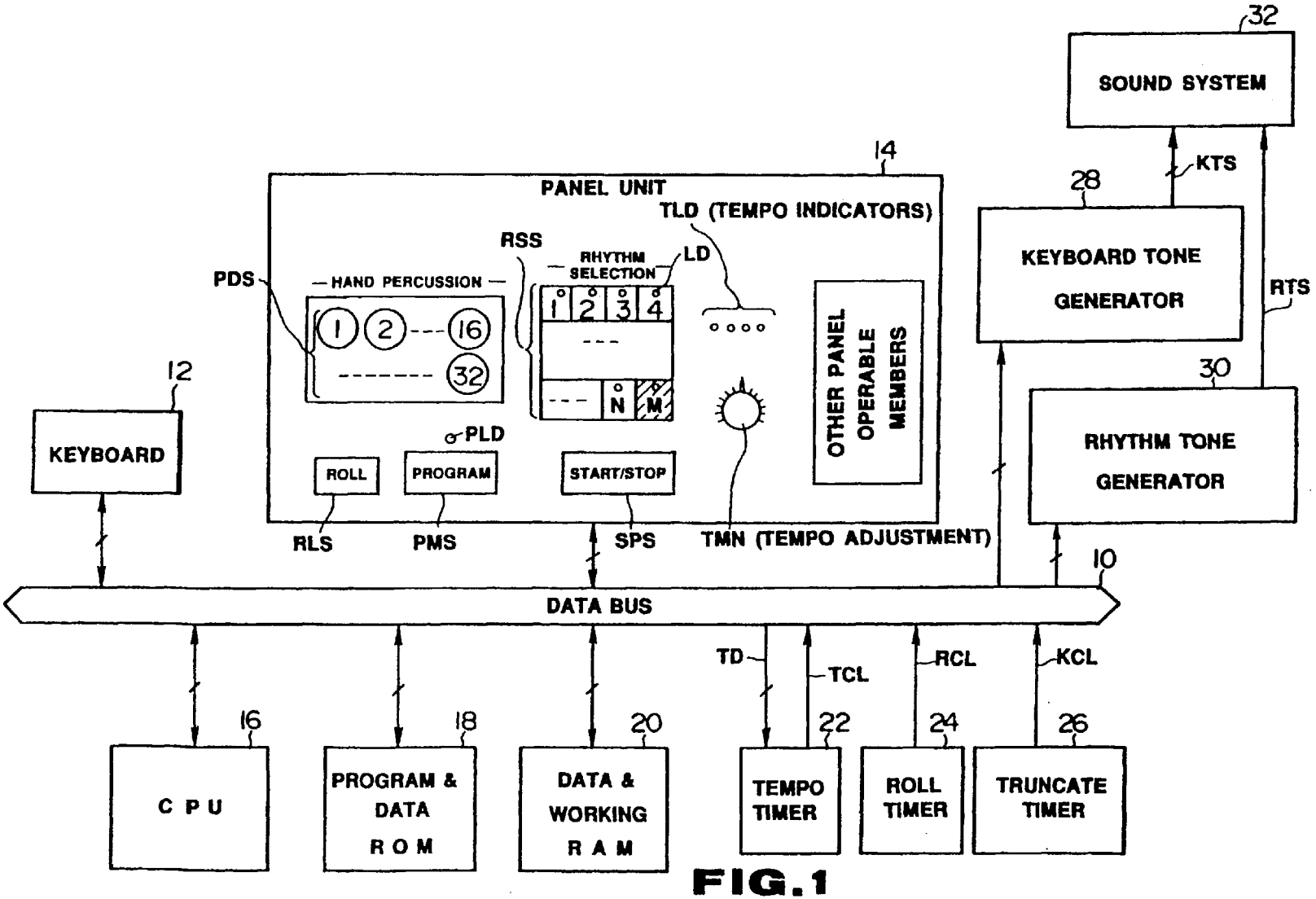
FIG. 1 is a block diagram showing constitution of an electronic musical instrument according to an embodiment of the present invention.
Figure 2:
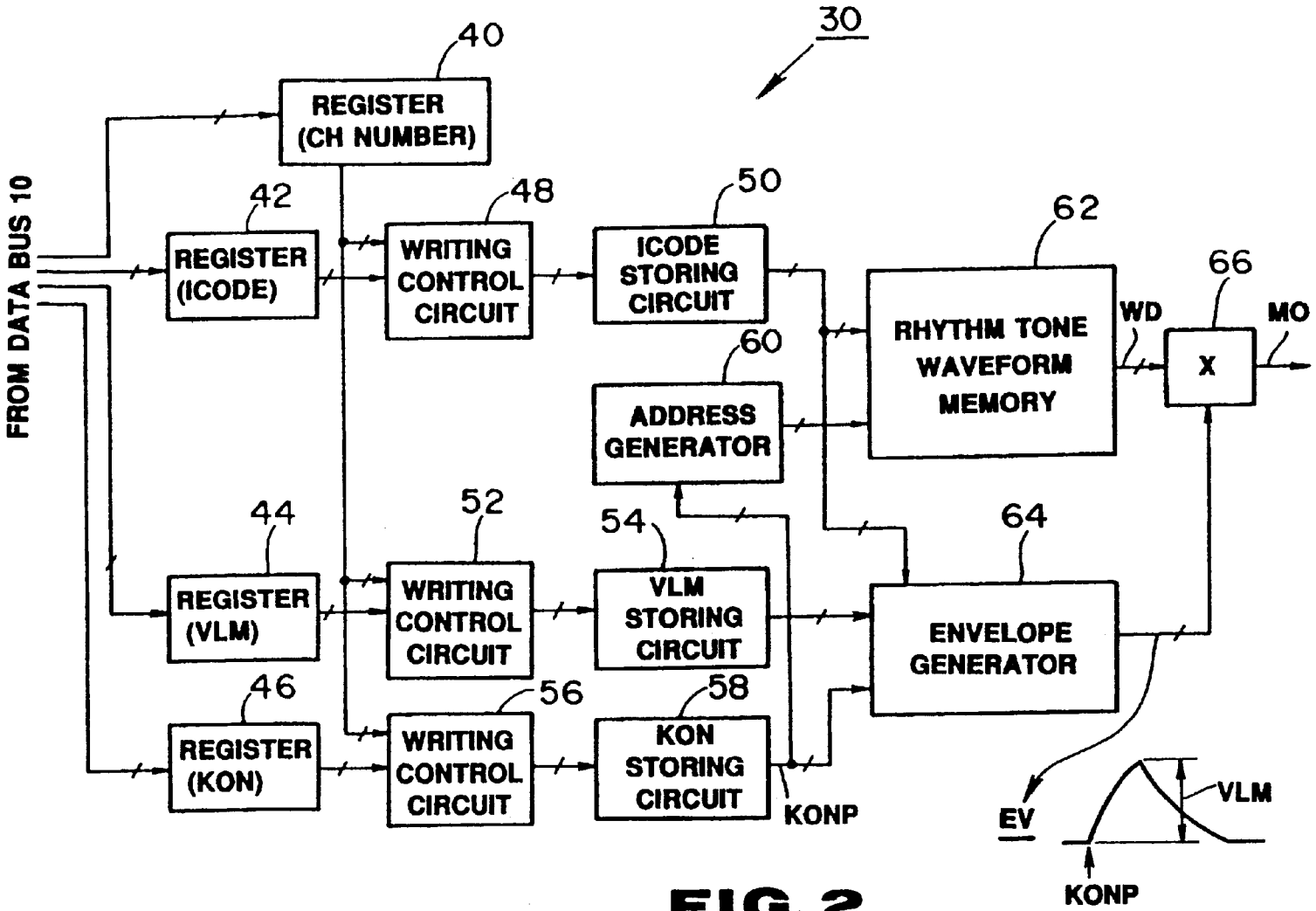
FIG. 2 is a block diagram showing detailed constitution of a rhythm tone generator shown in FIG. 1.

Referring now to the drawings wherein like reference characters designate like or corresponding parts throughout several views, FIG. 1 is a block diagram showing an electronic musical instrument according to an embodiment of the present invention. In this electronic musical instrument shown in FIG. 1, a microcomputer controls generation of manual performance tone based on operation of a keyboard, writing of rhythm patterns and generation of manual rhythm tone and auto-rhythm tones in a program mode, generation of auto-rhythm tone in a play mode and the like. In FIGS. 1 and 2, each signal line written by a slash line "/" designates plural signal lines or flow of a signal of plural bits.

[A] CONSTITUTION OF ELECTRONIC MUSICAL INSTRUMENT (FIG. 1)

In FIG. 1, a data bus 10 is connected with a keyboard 12, a panel unit 14, a central processing unit (CPU) 16, a program & data read only memory (ROM) 18, data & working random access memory (RAM) 20, a tempo timer 22, a roll timer 24, a truncate timer 26, a keyboard tone generator (TG) 28, a rhythm tone generator (TG) 30 and the like.

The keyboard 12 provides plural keys each capable of detecting its depressing key information.

The panel unit 14 provides several kinds of operable members for controlling the musical tone and performance and several kinds of indicators, wherein operation information is detected by each operable member.

As the operable members related to the present embodiment in the panel unit 14, pad switches PDS for hand percussion, rhythm selecting switches RSS, a roll designating switch RLS, a program mode designating switch PMS, a start/stop switch SPS and a tempo adjuster TMN are provided.

As the pad switches PDS, the present embodiment provides thirty-two self-reset pad switches corresponding to thirty-two rhythm tones of bass drum, snare drum, cymbal and the like.

As the rhythm selecting switches RSS, the present embodiment provides No. 1 to No. N rhythm selecting switches and another No. M rhythm selecting switch (where M and N designate arbitrary integral numbers). These No. 1 to No. N rhythm selecting switches correspond to N kinds of rhythm patterns such as march, waltz, rumba and the like which are set in factory in advance, while the No. M rhythm selecting switch is used for selecting the rhythm pattern programmed by the player. In addition, indicators LD each made by a light emitting diode (LED). Therefore, when one rhythm selecting switch is turned on in order to select the desirable rhythm, the corresponding indicator is lighted on.

The roll designating switch RLS is made by the self-reset switch. For example, when this switch RLS is simultaneously turned on with the desirable pad switch corresponding to the snare drum, it becomes possible to generate a roll of rhythm tones of snare drum.

Similarly, the program mode designating switch PMS is made by the self-reset switch. At every time when this switch PMS is operated, it is possible to selectively designate program mode and play mode alternatively. In the vicinity of the switch PMS, there is provided an indicator PLD made by the LED. This indicator PLD is lighted on when the program mode is designated.

The start/stop switch SPS is made by the self-reset switch. At every time when this switch SPS is operated, it is possible to alternatively designate one of the start and stop.

The tempo adjuster TMN for setting the desirable tempo is made by a controller capable of revolving. In the vicinity of this adjuster TMN, four tempo indicators TLD each made by the LED are laterally disposed in line. In the program mode and play mode, these four tempo indicators TLD are sequentially lighted on in response to the set tempo such that the set tempo will be indicated.

The CPU 16 executes several kinds of processes in accordance with the programs stored in the ROM 18. Detailed description of these processes will be given later by referring to FIGS. 6 to 17.

The ROM 18 stores the data concerning the rhythm patterns which are set in the factory in addition to the programs for several processes. The storing contents of this ROM 18 will be described later by referring to FIGS. 3A to 3C.

The RAM 20 has a storing portion for storing the data concerning the rhythm patterns which are programmed by the player. In addition, the RAM 20 includes another storing portion which is used as the working register when the CPU 16 executes the processes. The storing contents of this RAM 20 will be described later by referring to FIG. 5.

The tempo timer 22 generates a tempo clock signal TCL having the frequency corresponding to tempo data TD. Each clock pulse of this signal TCL is used in order to start a tempo clock interrupt process shown in FIGS. 13A and 13B.

The roll timer 24 generates a roll clock signal RCL. Each clock pulse of this signal RCL is used in order to start a roll timer interrupt process shown in FIG. 16. The cycle period for generating the clock in the roll timer 24 is set to several tens milli-seconds (ms), for example. However, it is possible to arbitrarily vary this cycle period in response to the operation of player or external signal.

The truncate timer 26 generates a truncate clock signal KCL. Each clock pulse of this signal KCL is used to start a truncate timer interrupt process shown in FIG. 17. The cycle period for generating the clock in the truncate timer 26 is set to several tens ms, for example.

The present embodiment provides three timers 22, 24 and 26. However, it is possible to obtain the necessary clock signals by dividing the frequency of clock generated from one timer.

The keyboard tone generator 28 generates a musical tone signal KTS corresponding to the depressed key based on the key-depression information which is detected from the keyboard 12.

The rhythm tone generator 30 generates a rhythm tone signal RTS based on the operation of pad switches PDS and/or selected rhythm pattern. Detailed description of this rhythm tone generator 30 will be given later in conjunction with FIG. 2.

The sound system 32 converts the musical tone signal KTS and rhythm tone signal RTS into the musical tone (or sound).

[B] CONSTITUTION OF RHYTHM TONE GENERATOR (FIG. 2)

FIG. 2 shows a constitution example of the rhythm tone generator 30. In this example, it is possible to simultaneously generate eight rhythm tones in maximum by driving eight rhythm tone source channels in a time division system.

Registers 40, 42, 44 and 46 are connected to the data bus 10. More specifically, the register 40 stores the channel number (i.e., CH number), the register 42 stores musical instrument code ICODE representative of the rhythm tone color kind the register 44 stores a volume value VLM corresponding to an attack level of envelope as shown by envelope waveform data EV, and the register 46 stores key-on information KON for designating the start of generating the rhythm tone. Then, the information is simultaneously transmitted to each of these registers 40, 42, 44 and 46 at the timing of each rhythm tone kind to be generated.

An ICODE storing circuit 50 includes eight time division channels. A writing control circuit 48 controls the writing of storing circuit 50 such that the musical instrument code ICODE from the register 42 will be assigned to the channel corresponding to the CH number from the register 40 within the eight time division channels. The storing circuit 50 stores the assigned musical instrument code circularly, and then this code will be outputted by the timing of the assigned channel.

Similarly, a VLM storing circuit 54 includes eight time division channels. A writing control circuit 52 controls the writing of this storing circuit 54 such that the volume value VLM from the register 44 will be assigned to the channel corresponding to the CH number from the register 40 within the eight time division channels. The storing circuit 54 stores the volume value circularly, and then this value will be outputted by the timing of the assigned channel.

Further, a KON storing circuit 58 includes eight time division channels. A writing control circuit 56 controls the writing of this storing circuit 58 such that the key-on information KON from the register 46 will be assigned to the channel corresponding to the CH number from the register 40 within the eight time division channels. The storing circuit 58 stores the key-on information circularly, and then this information will be outputted as key-on pulse KONP by the timing of the assigned channel.

A rhythm tone waveform memory 62 stores the rhythm tone waveform (including its rising portion and attenuating end portion), wherein this rhythm tone waveform is obtained by picking up the actual rhythm tones of a percussive musical instrument based on the pulse code modulation (PCM) recording method. In other words, the stored rhythm tone waveforms correspond to thirty-two rhythm tones which can be designated by the pad switches PDS.

In response to address information outputted from an address generator 60, the rhythm tone waveform corresponding to the musical instrument code assigned to each channel is read from the rhythm tone waveform memory 62. For example, in the case when the bass drum is assigned to a first channel, the rhythm tone waveform of bass drum is read out by the timing of the first channel.

An envelope generator 64 generates the envelope waveform data EV in response to the key-on pulse KONP, wherein this envelope waveform data EV are used for the rhythm tone corresponding to the musical instrument code assigned to each channel. The attack level of envelope indicated by the envelope waveform data EV is determined depending on the volume value VLM from the storing circuit 54.

Both of rhythm tone waveform data WD from the rhythm tone waveform memory 62 and envelope waveform data EV from the envelope generator 64 are supplied to a multiplier 66 wherein these two data WD and EV are multiplied by each channel. Then, as well-known, the multiplication result of this multiplier 66 is converted into an analog rhythm tone signal RTS by passing through an accumulator, digital-to-analog (D/A) converter etc. (not shown). This analog rhythm tone signal RTS is supplied to the sound system 32 shown in FIG. 1.

The above-mentioned rhythm tone generator 30 can simultaneously generate rhythm tone signals of eight channels. In addition, this rhythm tone generator 30 can generate several kinds of rhythm tone signals each corresponding to each storing waveform in the rhythm tone waveform memory 62 by designating the rhythm tone kind with the musical instrument code ICODE in each channel.

[C] STORING CONTENTS OF ROM 18 (FIG. 3)

FIG. 3 shows the storing contents of ROM 18. This ROM 18 includes a first storing portion used as a rhythm pattern memory as shown in FIG. 3A, a second storing portion used as a truncate value memory as shown in FIG. 3B, a third storing portion used as a volume value memory as shown in FIG. 3C and other storing portions for storing tone color parameters, musical effect parameters and the like (not shown).

The above rhythm pattern memory provides storing blocks RPMEM(1) to RPMEM(N) and track number storing areas PTNNUM(1) to PTNNUM(N), wherein the storing blocks RPMEM(1) to RPMEM(N) respectively store the rhythm patterns corresponding to N kinds of rhythms (i.e., "rhythm 1" to "rhythm N") and the storing areas PTNNUM (1) to PTNNUM(N) respectively store storing track numbers of these storing blocks.

The storing block RRMEM(1) corresponding to the rhythm 1 provides sixteen storing tracks each further providing a musical instrument code storing area PICODE, a roll designating information storing area PRLFLG and a timing information storing area. The arrangement of these storing tracks and storing areas in rhythm 2 to rhythm N is similar to that in this rhythm 1. However, the necessary storing track number differs in each rhythm. For example, the track number of rhythm 1 is set to sixteen (i.e., PTNNUM(1)=16), the track number of rhythm 2 is set to nine (i.e., PTNNUM(2)=9), and the track number of rhythm N is set to three (i.e., PTNNUM(N)=3).

Each musical instrument code storing area PICODE stores the musical instrument code representative of the rhythm tone kind, while each roll designating information storing area PRLFLG stores the roll designating information. In this case, the roll designation exists when this roll designating information takes the value "1", while the roll designation does not exist when this roll designating information takes the value "0". In the present embodiment, the rhythm tone kind with the roll designation is treated independent of the rhythm tone kind representative of the same rhythm tone without the roll designation. For example, independent storing tracks are respectively given to the snare drum and snare drum roll. These two storing tracks have the same musical instrument code in each storing area PICODE. However, the snare drum corresponds to the roll designating information having the value "0", while the snare drum roll corresponds to the roll designating information having the value "1".

In addition, each timing information storing area provides sixty-four storing cells PTN corresponding to the count values "0" to "63" of tempo counter TPCTR (which correspond to the timings capable of generating tones). The value "1" is stored in each storing cell corresponding to the timing requiring the tone generation, while the value "0" is stored in each storing cell corresponding to the timing which does not require the tone generation. The tempo counter TPCTR belongs to the RAM 20 and repeatedly counts the tempo clock signal TCL by every two bars, which will be described later. Therefore, the information stored in each timing information storing area indicates a tone generation control pattern of two bars.

FIG. 4 shows an example of timing data of one bar concerning the bass drum, snare drum and snare drum roll. As for the succeeding bar, similar timing data as shown in FIG. 4 will be stored.

In FIG. 4, one section includes eight tone-generation enable timings (which correspond to the values "0" to "7" of the tempo counter TPCTR. In each of the bass drum, snare drum and snare drum roll, the tone-generation requiring information having the value "1" or tone-generation not requiring information having the value "0" is arranged with respect to each tone-generation enable timing. In FIG. 4, the arrow which starts from the value "1" or "0" in its left side indicates that the same value is repeatedly arranged in its direction.

According to the timing data shown in FIG. 4, the tone of bass drum is started to be generated at the head timings of first and third sections respectively. In addition, the roll tone-generation of snare drum roll is designated in a period between the head timing of first section and end timing of second section. In such period, the roll tone is generated in accordance with the roll timer interrupt process shown in FIG. 16.

With respect to the rhythms 1 to N, the rhythm codes 1 to N are predetermined. The rhythm code corresponding to the selected rhythm (e.g., march) is set in the rhythm code register RCODE within the RAM 20. Meanwhile, track number is set in a track number register TRN within the RAM 20, which will be described later. Therefore, it is possible to designate the specific storing track concerning the specific rhythm by use of the registers RCODE and TRN.

For example, in the rhythm 1 as shown in FIG. 3A, when the register values are set as RCODE=1 and TRN=10, it is possible to designate the storing track 10 of rhythm 1 in which the information of storing areas PICODE and PRLFLG can be read out. Further, by use of the tempo counter TPCTR, it is possible to designate the storing cell PTN from which tone-generation control information (having the value "1" or "0") of one tone-generation enable timing can be read out.

Meanwhile, each truncate value is stored in the truncate value memory shown in FIG. 3B in correspondence with each of thirty-two rhythm tones (corresponding to "musical instruments 1 to 32") which can be set by the pad switches PDS. Each truncate value is determined in consideration of tone-generation period of corresponding rhythm tone kind (especially, attenuating time). In the present embodiment, as the tone-generation period becomes longer, the truncate value becomes larger. In FIG. 3B, "musical instrument 1" is the bass drum, "musical instrument 2" is the snare drum and "musical instrument 32" is a conga. The present embodiment does not discriminate the roll tone from the normal tone, however, it is possible to independently store the normal tone and roll tone.

Similar to the above-mentioned truncate value memory, the volume value memory shown in FIG. 3C stores the volume value VLM with respect to each of "musical instrument 1" to "musical instrument 32". In this case, if the snare drum tone and snare drum roll tone are simultaneously generated with the same tone volume, the snare drum tone must be masked by the snare drum roll tone, so that the snare drum tone can not be heard as the main tone. This is not preferable for the musical performance. For this reason, in the present embodiment, the normal tone and roll tone take the different volume values by each rhythm tone kind. More specifically, the volume value of roll tone is set equal to the half volume value of normal tone.

[D] STORING CONTENTS OF RAM 20 (FIG. 5)

FIG. 5 shows the storing contents of RAM 20. This RAM 20 includes a first storing portion which is used as a rhythm pattern memory as shown in FIG. 5(A), a second storing portion which is used as a channel assigning memory as shown in FIG. 5(B), a third storing portion which is used as the working memory as shown in FIG. 5(C) and a fourth storing portion (not shown) concerning other panel operable members, tone-generation assignment and the like.

The above-mentioned rhythm pattern memory shown in FIG. 5(A) provides a storing block RPMEM(M) for storing the rhythm pattern corresponding to a rhythm code M and a track number storing area PTNNUM(M) for storing the storing track number which is used in the storing block.

The storing block RPMEM(M) provides sixteen storing tracks each of which further provides a musical instrument code storing area PICODE, a roll designating information storing area PRLFLG and a timing information storing area. The data formats of these three storing areas are similar to those of the rhythm pattern memory as shown in FIG. 3A.

In the program mode, when one of thirty-two pad switches PDS is arbitrarily operated, the storing area PICODE of track 1 writes in the musical instrument code indicative of the rhythm tone kind corresponding to the operated pad switch. In this case, when the roll designating switch RLS is simultaneously operated, the value "1" is written into the storing area PRLFLG of track 1. On the contrary, when this switch RLS is not simultaneously operated, the value "0" is written into this storing area PRLFLG. In the timing information storing area of track 1, the value "1" is written into the storing cell PTN corresponding to the value of tempo counter TPCTR at this time.

Next, similar to the case of track 1, the musical instrument code, roll designating information and timing information are respectively written into the storing areas PICODE and PRLFLG and timing information storing area of the track 2 when another pad switch is operated. Then, when the first pad switch described before is operated, the musical instrument code, roll designating information and timing information are respectively written into the corresponding storing areas of the track 1.

As described above, at every time when each of the pad switches which have not been assigned is operated, the pattern writing is executed such that a new track will be assigned. For example, in the case where the rhythm pattern consists of eight kinds of rhythm tones, such rhythm pattern is written into track 1 to track 8 and the value of track number storing area PTNNUM(M) finally reaches "8".

For example, as shown in the track 8 in the program mode and play mode, it is possible to designate the storing area PICODE by use of the registers RCODE and TRN, and it is possible to designate the storing cell PTN by further use of the tempo counter TPCTR.

Meanwhile, the channel assigning memory as shown in FIG. 5(B) provides eight musical instrument code registers ICODE(1) to ICODE(8), eight truncate counters TCTR(1) to TCTR(8), eight roll flags RLFLG(1) to RLFLG(8) and eight volume value registers VLM(1) to VLM(8) with respect to eight channels CH1 to CH8.

Figure 17:
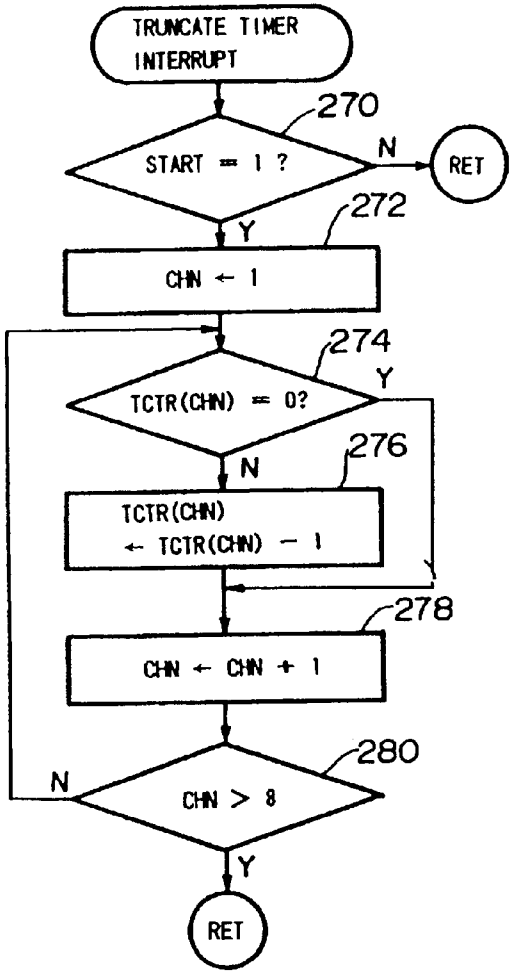
FIG. 17 is a flowchart showing a truncate timer interrupt process.

Each musical instrument code register stores each musical instrument code concerning the corresponding channel. Each truncate counter stores the truncate value which is read from the truncate value memory shown in FIG. 3B with respect to the corresponding channel, and the stored truncate value is decremented by one in a truncate timer interrupt process as shown in FIG. 17. Each roll flag stores the roll designating information concerning the corresponding channel. Each volume value register stores the volume value VLM which is read from the volume value memory shown in FIG. 3C with respect to the corresponding channel.

The working memory as shown in FIG. 5(C) provides the following ten registers:

(1) The rhythm code register RCODE which stores the rhythm code (i.e., one of rhythm codes 1 to N, M) corresponding to the operated rhythm selecting switch RSS;

(2) The pad code register PDCODE which stores the musical instrument code (i.e., one of musical instrument codes 1 to 32) indicative of the rhythm tone kind corresponding to the operated pad switch PDS;

(3) The tempo counter TPCTR which repeatedly counts the tempo clock signal TCL by every two bars, wherein its count value varies between "0" to "63" within two bars and the count value is reset to "0" at the timing when the count value reaches at "64";

(4) The program mode flag PRGFLG which takes the value "1" in the program mode but the value "0" in the play mode;

(5) The start flag START which takes the value "1" in rhythm running state but the value "0" in rhythm stop state;

(6) The roll designating information register RLSW which takes the value "1" during the switch RLS is operated but the value "0" during the switch RLS is not operated;

(7) The track number register TRN which stores the track number (which varies from "1" to "16");

(8) The assigning channel number register ACH which stores the channel number corresponding to the channel to which the musical instrument code is assigned;

(9) The channel number register CHN which stores the channel number (which varies from "1" to "8"); and

(10) The tempo count value register DTPCTR to which the tempo count value in the preceding tempo clock interrupt timing (i.e., the value obtained by subtracting "1" from the value of tempo counter TPCTR) is set.

[E] PANEL OPERATION CONCERNING RHYTHM PERFORMANCE (FIG. 1)

Prior to the description of several processes in FIGS. 6 to 17, description will be given with respect to diagrammatical panel operation concerning the rhythm performance.

When the rhythm pattern is to be programmed, the program mode designating switch PMS is operated so that the program mode will be selected (where the indicator PLD must be lighted on). Then, the rhythm selecting switch corresponding to the rhythm code M within the rhythm selecting switches RSS is operated, so that the writing of storing block RPMEM(M) is enabled. Further, the desirable tempo is set by the tempo adjuster TMN. Thereafter, when the start/stop switch SPS is operated so that the start command is given, the tempo indicators TLD are lighted on in accordance with the set tempo. Therefore, one of the pad switches PDS is operated a number of times in response to the indicated tempo so that the timing information concerning the specific rhythm tone kind (e.g., the bass drum) is inputted by real time. In this case, at every time when such information is inputted, the inputted rhythm tone (i.e., manual rhythm tone) is generated.

After completing the above input operation, the input operation is similarly executed with respect to another rhythm tone kind (e.g., snare drum). At this time, the inputting manual rhythm tone is generated simultaneously with the auto-rhythm tone based on the previously inputted timing information. Similarly, thereafter, the input operation is executed with respect to the necessary number of rhythm tone kinds, so that the rhythm pattern corresponding to the rhythm code M can be completed. Then, if such input operation is completed, the start/stop switch SPS is operated so that the stop command is inputted.

Meanwhile, in order to execute the automatic rhythm performance based on the desirable rhythm pattern, the play mode must be selected by operating the program mode designating switch PMS (where the indicator PLD is lighted on). Then, the rhythm selecting switch corresponding to the desirable rhythm (i.e., one of the rhythm codes 1 to N & M) within the switches RSS is turned on. Further, after the tempo is set by the tempo adjuster TMN, the start command is inputted by operating the start/stop switch SPS. Thus, the tempo indicators TLD are lighted on in accordance with the set tempo, and the auto-rhythm tone will be generated.

In this case, the keyboard 12 can be performed manually by using the auto-rhythm tones as the accompaniment tones. In a meantime, it is possible to generate the manual rhythm tone by operating the pad switch PDS according to needs.

[F] MAIN ROUTINE (FIG. 6)

Figure 6:
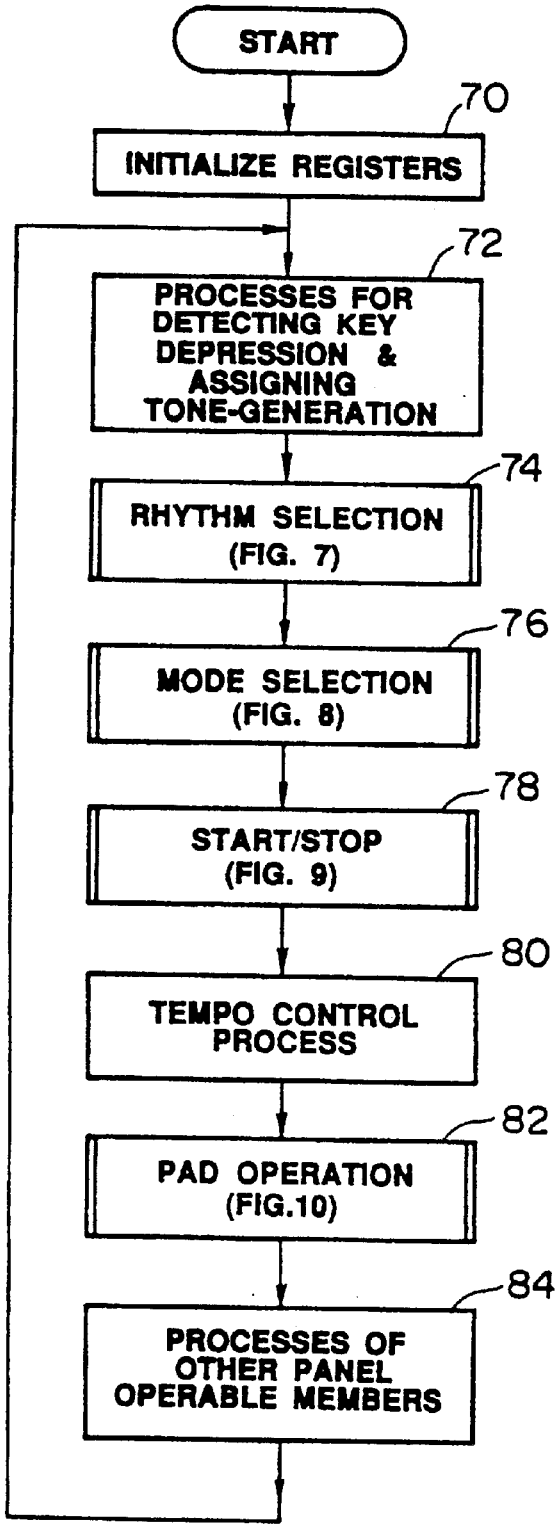
FIG. 6 is a flowchart showing a main routine of electronic musical instrument according to an embodiment of the present invention.

FIG. 6 is a flowchart showing the main routine process, wherein this main routine is started by applying the power to the present system.

First, the several registers are initialized in a step 70. For example, the value "0" is set to the registers START, PRGFLG, TPCTR and the like.

Next, processes for detecting the key-depression and assigning the tone-generation are executed in a step 72. More specifically, the key-depression information is detected from the keyboard 12 and then assigned to the desirable channel of the keyboard tone generator 28, from which the musical tone signal KTS corresponding to the depressed key is generated. Thus, the manual performance can be executed in response to the key-depression. After executing the step 72, the processing proceeds to a step 74.

In the step 74, the rhythm selection subroutine is executed, which will be described later in conjunction with FIG. 7. Then, the processing proceeds to a step 76 wherein the mode selection subroutine is executed, which will be described later in conjunction with FIG. 8. Thereafter, the processing proceeds to a step 78 wherein the start/stop subroutine is executed, which will be described later in conjunction with FIG. 9. After executing the step 78, the processing proceeds to a step 80.

In the step 80, the tempo control process is executed. More specifically, the tempo data TD corresponding to the tempo which is set by the tempo adjuster TMN are outputted to the tempo timer 22, whereby the frequency of tempo clock signal TCL is set in response to the tempo data TD. Then, the processing proceeds to a step 82.

In the step 82, the pad operation subroutine is executed, which will be described later in conjunction with FIG. 10. Then, the processing proceeds to a step 84.

In the step 84, processes of other panel operable members (concerning the tone color, musical effect and the like, for example) are executed. Thereafter, the processing returns to the step 72, whereby the above-mentioned processes are repeatedly executed.

[G] RHYTHM SELECTION SUBROUTINE (FIG. 7)

Figure 7:
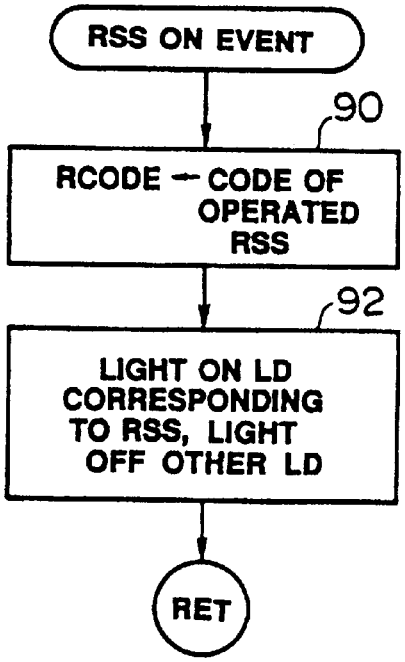
FIG. 7 is a flowchart showing a rhythm selection subroutine.
Figure 9:
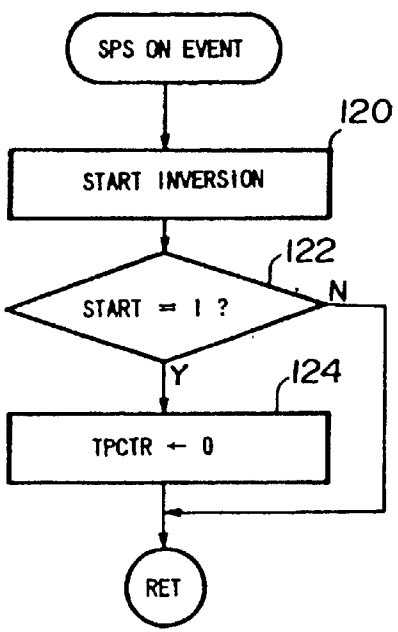
FIG. 9 is a flowchart showing a start/stop subroutine.

When the on event is occurred in one of the rhythm selecting switches RSS in a step 90 shown in FIG. 7, the rhythm code corresponding to the operated rhythm selecting switch is set to the register RCODE. Then, the processing proceeds to a step 92.

In the step 92, the indicator LD corresponding to the operated rhythm selecting switch is lighted on, while other indicators are lighted off. Thereafter, the processing returns to the main routine shown in FIG. 6. Incidentally, the letters "RET" means "return" in FIG. 7 etc.

[H] MODE SELECTION SUBROUTINE (FIG. 8)

Figure 8:
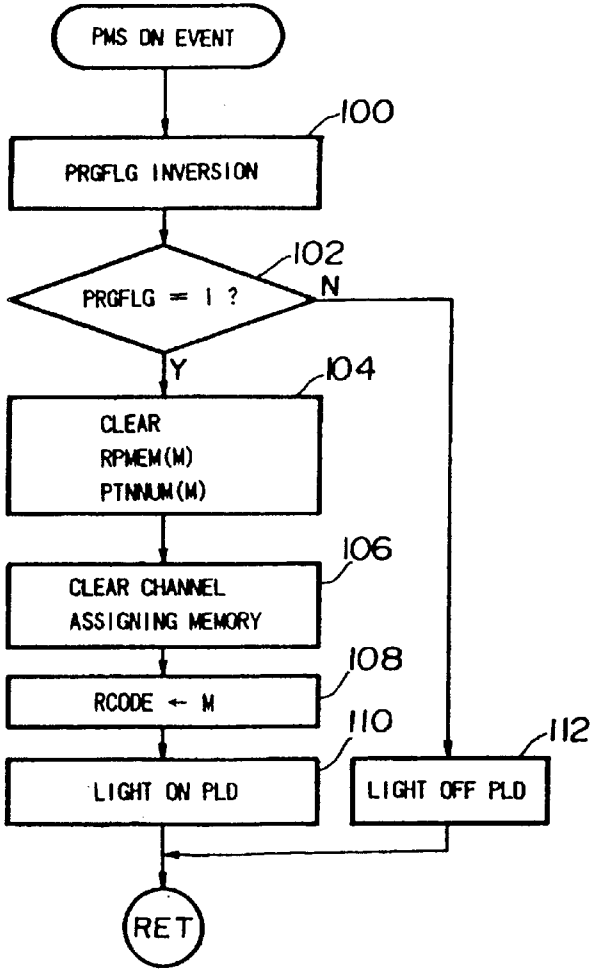
FIG. 8 is a flowchart showing a mode selection subroutine.

When the on event is occurred in the program mode designating switch PMS, the value of flag PRGFLG is inverted in a first step 100 shown in FIG. 8. More specifically, this value is turned to "1" when this value is "0", while this value is turned to "0" when this value is "1". Then the processing proceeds to a step 102.

In the step 102, it is judged whether the value of flag PRGFLG is equal to "1" (indicating the program mode) or not. If the judgement result of this step 102 is "YES", the processing proceeds to a step 104.

In the step 104, all contents of the storing block RPMEM (M) are cleared, and all contents of the storing block PTNNUM(M) are also cleared. Then, the processing proceeds to a step 106 wherein all contents of the channel assigning memory shown in FIG. 5(B) are cleared. In the next step 108, the rhythm code M is set to the register RCODE. These processes as described heretofore must be executed in order to enable the writing of new rhythm pattern. After completing the step 108, the processing proceeds to a step 110.

In the step 110, the indicator PLD is lighted on so that the mode is turned to the program mode. Thereafter, the processing returns to the main routine shown in FIG. 6.

If the judgement result of this step 102 is "NO", it is indicated that the present mode is the play mode. Therefore, the indicator PLD is lighted off in a step 112, and the processing returns to the main routine.

[I] START/STOP SUBROUTINE (FIG. 9)

When the on event is occurred in the start/stop switch SPS, the value of flag START is inverted in a step 120. More specifically, this value is turned to "1" when this value is "0", while this value is turned to "0" when this value is "1". Then, the processing proceeds to a step 122.

In the step 122, it is judged whether the value of flag START is equal to "1" (indicating the start command) or not. If the judgement result of this step 122 is "YES", the processing proceeds to a step 124 wherein the value "0" is set to the tempo counter TPCTR. This enables to read the rhythm pattern from the head of its first bar in the rhythm start timing.

If the step 124 is completed or if the judgement result of step 122 is "NO" (indicating the stop command), the processing returns to the main routine.

[J] PAD OPERATION SUBROUTINE (FIG. 10)

When the on event is occurred in the pad switch PDS, the processing proceeds to a step 130 wherein it is judged whether the value of flag PRGFLG is equal to "1" (indicating the program mode) or not. If the judgement result of this step 130 is "NO", it is indicated that the present mode is the play mode, so that the processing returns to the main routine. On the contrary, if the judgement result of this step 130 is "YES", it is indicated that the present mode is the program mode. Then, the processing proceeds to a step 132.

In the step 132, the musical instrument code indicative of the rhythm tone kind corresponding to the operated pad switch is set to the register PDCODE. Then, the processing proceeds to a step 134.

In the step 134, it is judged whether the roll designating switch RLS is turning on or not. If the judgement result of this step 134 is "YES", the processing proceeds to a step 136 wherein the value "1" is set to the register RLSW. If the judgement result of this step 134 is "NO", the processing proceeds to a step 138 wherein the value "0" is set to the register RLSW. After executing the step 136 or 138, the processing proceeds to a step 140.

In the step 140, the value "0" is set to the track number register TRN. Then, the processing proceeds to a step 142 wherein the value of this register TRN is incremented by one. Thereafter, the processing proceeds to a step 144.

In this case, the storing area PICODE(M,TRN) is designated by the rhythm code and track number of registers RCODE and TRN, while another storing area PRLFLG(M, TRN) is designated by the rhythm M and track number of register TRN. Then, in the step 144, it is judged whether the musical instrument code of storing area PICODE(M,TRN) is identical to that of register PDCODE or not and whether the roll designating information of storing area PRLFLG (M,TRN) is identical to that of register RLSW or not. In other words, it is judged whether or not the assigning operation is executed on the track corresponding to the rhythm tone kind M and track number TRN which are designated by the present operation. For example, in the case where the desirable pad switch is operated at first after designating the program mode, the value of storing area PICODE(M,1) is equal to "0", so that the judgement result of step 144 is turned to "NO". Then, the processing proceeds to the step 146.

In the step 146, it is judged whether the value of register TRN is larger than the value of storing area PTNNUM(M) designated by the rhythm code M or not. In this case, the value of storing area PTNNUM(M) represents the number of tracks which are used until now. In the first pad operation, the value of storing area PTNNUM(M) is set to "0" in the step 104 shown in FIG. 8 and the value of register TRN is set to "1". Therefore, the judgement result of this step 146 is turned to "YES". Then, the processing proceeds to the step 148.

In the step 148, it is judged whether the value of register TRN is larger than the maximum number "16" of usable tracks or not. If the judgement result of this step 148 is "YES", it is unable to execute the writing operation, so that the processing returns to the main routine.

If the judgement result of step 148 is "NO", the writing operation can be executed, so that the processing proceeds to a step 150.

In this step 150, the musical instrument code of register PDCODE is written into the storing area PICODE(M,TRN), the roll designating information of register RLSW is written into the storing area PRLFLG(M,TRN) and the track number of register TRN is written into the storing block PTNNUM(M) respectively. Then, the processing proceeds to a step 152.

In the step 152, the value "1" is written into the storing cell PTN(M,TRN,TPCTR) which is designated by the rhythm code M, channel number of register TRN and count value of tempo counter TPCTR. Incidentally, the tempo counter TPCTR executes the counting operation in the play mode and program mode, which will be described later in conjunction with FIG. 13.

By the way, in the case where the second pad operation is executed after the first pad operation and the secondly operated pad switch is identical to the firstly operated pad switch, the judgement result of the step 144 turns to "YES", so that the processing proceeds to the step 152. Similar to the preceding operation described before, the timing information is written into the track indicated by TRN=1 in the step 152.

In this case, if the pad switch which is different from the firstly operated pad switch is operated, or if the pad switch and roll designating switch which are identical to those in the first operation are simultaneously operated, the judgement result of step 144 turns to "NO". Then, the processing proceeds to the step 146.

In the step 146, TRN=1 and PTNNUM(M)=1, so that its judgement result turns to "NO". Then, the processing returns to the step 142. In this step 142, the value of register TRN is incremented to "2", and then the processing proceeds to the step 144.

In the step 144, both of the values of storing areas PICODE(M,2) and PRLFLG(M,2) corresponding to the track 2 are equal to "0" (which means that the track 2 is no assigned with information). Thus, the judgement result of this step 144 is "NO", the processing proceeds to the step 146.

In the step 146, TRN=2 and PTNNUM(M)=1, so that its judgement result turns to "YES". Therefore, the processing proceeds to the step 150 via the step 148.

In the step 150, as similar to the preceding track of TRN=1, the musical instrument code and roll designating information are respectively written in the track of TRN=2, and the value "2" is written into the storing block PTNNUM (M). Thereafter, in the step 152, the timing information is written into the track of TRN=2.

Figure 10:
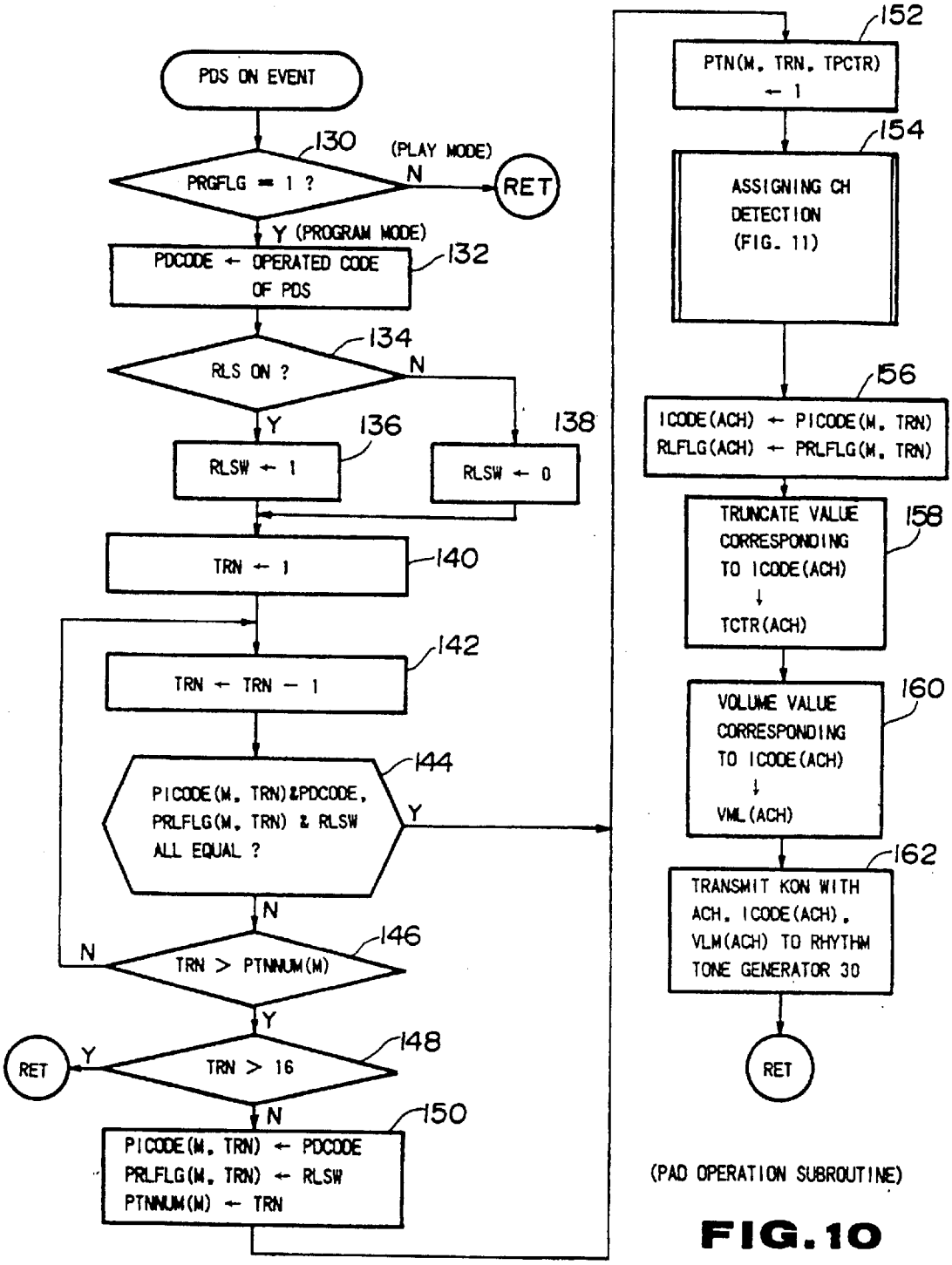
FIG. 10 is a flowchart showing a pad operation subroutine.

Meanwhile, in the case where the value of storing block PTNNUM(M) reaches at "5" by some pad operations, the processing proceeds to the pad operation subroutine shown in FIG. 10 in response to the new pad operation. Then, when the processing proceeds to the step 146, TRN=1 and PTNNUM(M)=5, so that its judgement result turns to "NO". Then, the processing returns to the step 142. Thereafter, the processes after the step 142 are executed similarly.

Thus, if there is not assigned track by searching the value of register TRN from "1" to "5", the value of register TRN turns to "6" in the step 142, so that the judgement result of step 144 turns to "NO". Because, no musical instrument code is assigned to the track 6 (i.e., PICODE(M,6)=0).

Thereafter, since TRN=6 and PTNNUM(M)=5 in the step 146, its judgement result turns to "YES", so that the processing proceeds to the step 150 via the step 148. Then, the writing processes in the steps 150 and 152 described before are executed with respect to TRN=6.

When it is detected that the rhythm tone kind concerning the present pad operation has been already assigned to some track in the process of sequentially searching the value of register TRN from "2" to "5", the processing proceeds from the step 144 to the step 152. Then, the timing information is written in with respect to the track number of register TRN at this time. For example, when it is detected that the track of TRN=4 has been already assigned, the processing proceeds from the step 144 to the step 152, wherein the timing information is written into the track of TRN=4. In this case, the track of TRN=5 is not searched.

In the above-mentioned steps 132 to 152, at every time when any rhythm tone kind is designated, it is judged that such rhythm tone kind has been already assigned to any one of the tracks. If there is the assigned track, the timing information concerning such rhythm tone kind is written into such assigned track. On the contrary, if there is no assigned track, the rhythm tone kind is assigned to and its corresponding timing information is written into one of un-assigned tracks. By repeatedly executing the above-mentioned processes, it becomes possible to write in the desirable rhythm pattern to the rhythm pattern program memory shown in FIG. 5(A).

After executing the step 152, the processing proceeds to the step 154 wherein the assigning channel (CH) detection subroutine is executed, which will be described later in conjunction with FIG. 11. In this subroutine, the channel to which the musical instrument code is to be assigned is detected, and the channel number corresponding to such channel is set to the register ACH. Then, the processing proceeds to a step 156.

In the step 156, the musical instrument code of the storing area PICODE(M,TRN) is set to the register ICODE(ACH) corresponding to the channel number of register ACH, while the roll designating information of storing area PRLFLG (M,TRN) is set to the flag RLFLG(ACH) corresponding to the channel number of register ACH. As a result, the designated rhythm tone kind is assigned to the channel which is detected in the step 154. When the value "1" is set to the flag RLFLG(ACH), the roll tone generation is automatically started by the roll timer interrupt process shown in FIG. 16. After executing the step 156, the processing proceeds to the step 158.

In the step 158, the truncate value corresponding to the musical instrument code of register ICODE(ACH) is read from the truncate value memory shown in FIG. 3B, and the read truncate value is set to the truncate counter TCTR (ACH) corresponding to the channel number of register ACH. Then, this truncate value is decremented by one in the truncate timer interrupt process shown in FIG. 17.

In the next step 160, the volume value VLM corresponding to the musical instrument code of register ICODE(ACH) and the roll designating information of flag RLFLG(ACH) is read from the volume value memory shown in FIG. 3C. Such read volume value VLM is set to the register VLM (ACH) corresponding to the channel number of register ACH.

Thereafter, in a step 162, the channel number of register ACH, the musical instrument code of register ICODE (ACH), the volume value of register VLM(ACH) and the key-on information KON are respectively outputted to the registers 40, 42, 44 and 46 within the rhythm tone generator 30. Thus, the rhythm tone generator 30 generates the rhythm tone signal RTS corresponding to the rhythm tone kind indicated by the musical instrument code of register ICODE (ACH) from the channel corresponding to the channel number of register ACH, wherein such rhythm tone signal RTS has the attack level corresponding to the volume value of register VLM(ACH). After executing the step 162, the processing returns to the main routine.

Due to the above-mentioned steps 154 to 162, at every time when the rhythm tone kind is designated, the rhythm tone corresponding to such rhythm tone kind is generated by assigning such rhythm tone kind to the adequate channel, so that the manual rhythm performance can be done in the program mode. Therefore, the player can program the desirable rhythm pattern with listening to the manual rhythm tones obtained by performing the keyboard by himself.

[K] ASSIGNING CHANNEL DETECTION SUBROUTINE (FIG. 11)

Figure 11:
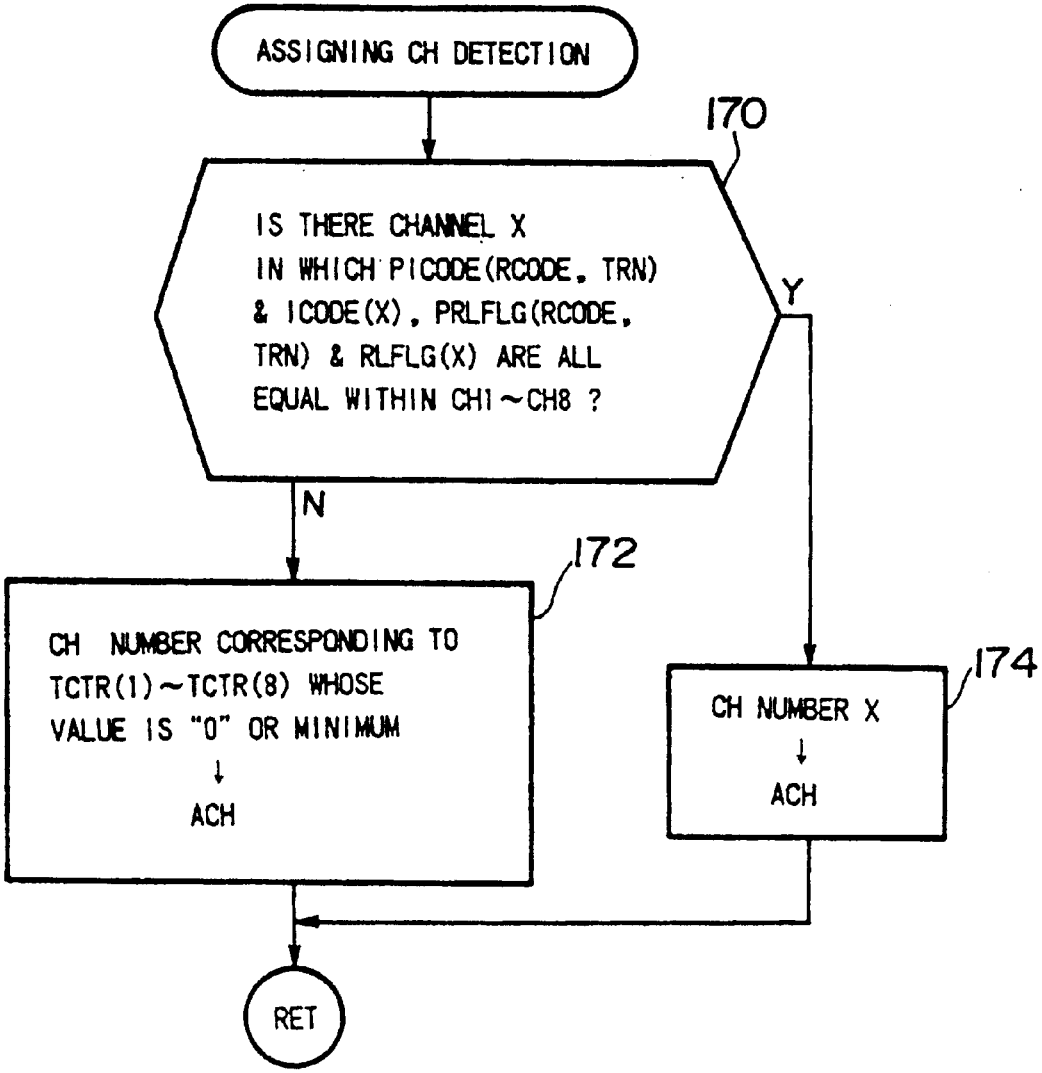
FIG. 11 is a flowchart showing an assigning channel detection subroutine.

In a first step 170 shown in FIG. 11, it is judged whether the rhythm tone kind requiring the assignment has been already assigned to any one of the channel 1 (CH1) to channel 8 (CH8) or not. In this case, each of the storing areas PICODE(RCODE,TRN) and PRLFLG(RCODE,TRN) is designated by the rhythm code of register RCODE and the track number of register TRN. Thus, in other words, the step 170 judges whether or not there is the channel X wherein the musical instrument code of storing area PICODE(RCODE, TRN) coincides with that of register ICODE(X) corresponding to the channel number X (which varies from "1" to "8") and the roll designating information of storing area PRLFLG (RCODE,TRN) coincides with that of flag RLFLG(X). If the judgement result of this step 170 is "NO", the processing proceeds to a step 172. However, if the judgement result of step 170 is "YES", the processing proceeds to a step 174.

In the step 172, if there is the tempo counter whose value is "0" (i.e., the tempo counter in which corresponding tone-generation is stopped) within eight truncate counters TCTR(1) to TCTR(8), the channel number (CH number) corresponding to such tempo counter is entered into the register ACH. If there is no tempo counter whose value is "0", the register ACH stores the CH number corresponding to the tempo counter whose value is minimum within eight truncate counters TCTR(1) to TCTR(8).

In the step 174, the register ACH stores the CH number X of the channel which has been already assigned. After executing the step 172 or 174, the processing returns to the original routine as shown in FIG. 10 or 13.

In the assigning channel detection subroutine shown in FIG. 11, when it is required to assign a new rhythm tone kind other than the assigned rhythm tone kinds in the state where eight channels are all used, such new rhythm tone kind is assigned to the channel corresponding to the tempo counter whose value is minimum within eight truncate counters TCTR(1 to TCTR(8). Such rhythm tone kind is generated instead of the rhythm tone kind which is mostly attenuated.

In the case where the subroutine shown in FIG. 11 is used in the subroutine shown in FIG. 10, the rhythm code of register RCODE must be equal to M. Therefore, the step 170 must judge whether or not the channel X is existed based on the musical instrument code of storing area PICODE(M, TRN) and the roll designating information of storing area PRLFLG(M,TRN).

[L] PAD TONE-GENERATION PROCESS IN PLAY MODE (FIG. 12)

If it is judged that the present mode is the play mode in the step 130 shown in FIG. 10, the pad operation subroutine does not execute any process. However, it is possible to generate the rhythm tone based on the pad operation in the play mode, so that such example will be shown in FIG. 12.

Figure 12:
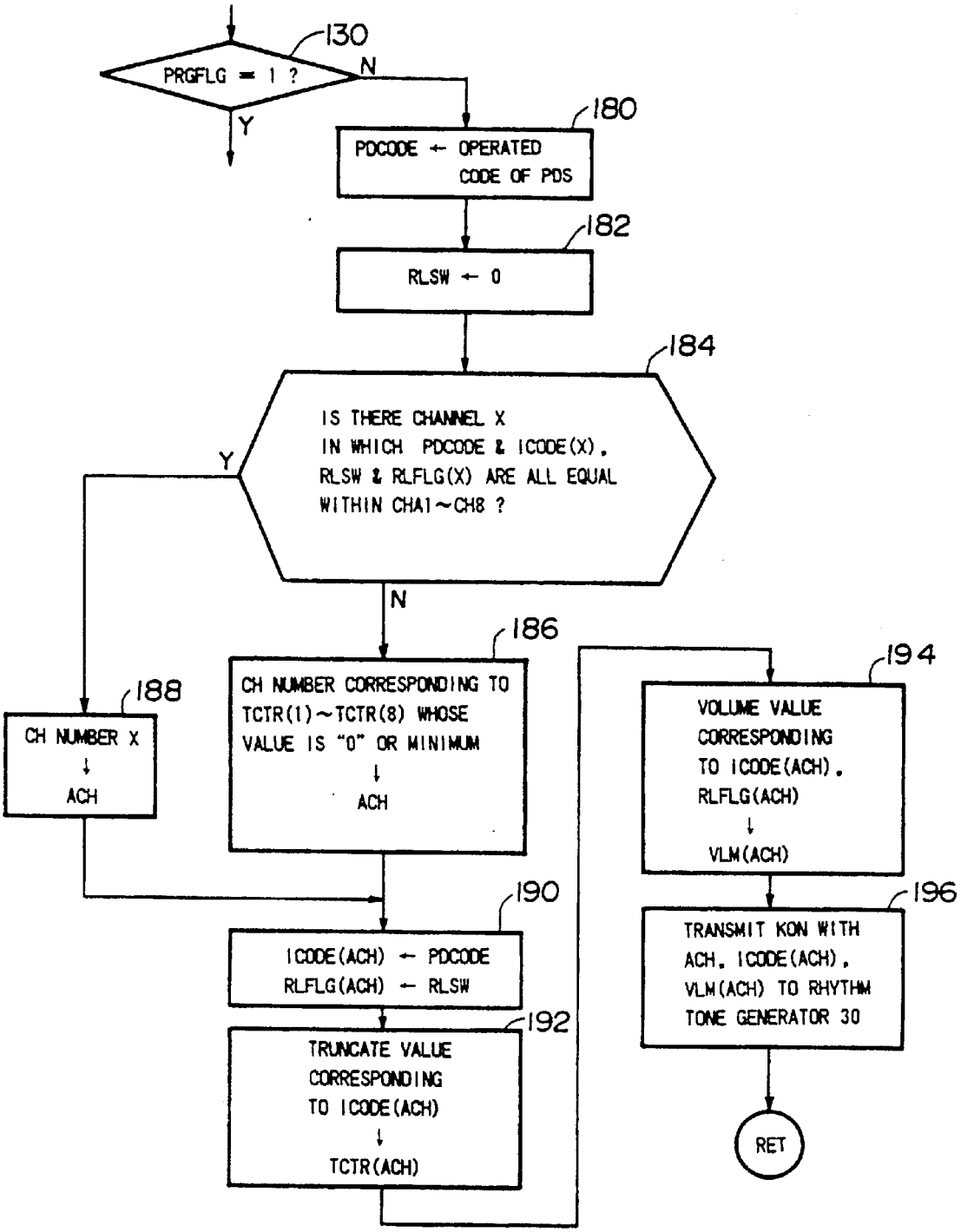
FIG. 12 is a flowchart showing a pad tone-generation process in play mode.

When it is judged that the present mode is the play mode in the step 130 shown in FIG. 10, the processing proceeds to the step 180 shown in FIG. 12. In the step 180, the musical instrument code indicating the rhythm tone kind corresponding to the operated pad switch is set to the register PDCODE. Then, the processing proceeds to a step 182.

In the step 182, the value "0" is set to the register RLSW. As described above, this example forces to reset the value of roll designating information to "0", so that the automatic roll tone-generation is not executed. However, as described in conjunction with FIG. 10, it is possible to automatically generate the roll tone by detecting the operation of roll designating switch RLS.

In the next step 184, it is judged whether the designated rhythm tone kind has been already assigned to any one of CH1 to CH8 or not. This judgement of step 184 is similar to that of step 170 shown in FIG. 11 except that the registers PDCODE and RLSW are used instead of the storing areas PICODE(RCODE,TRN) and PRLFLG(RCODE,TRN).

If the judgement result of this step 184 is "NO", the processing proceeds to a step 186. Similar to the step 172 shown in FIG. 11, this step 186 stores the CH number in the register ACH, wherein this CH number corresponds to the tempo counter whose value is "0" or minimum within eight truncate counters TCTR(1) to TCTR(8).

If the judgement result of step 184 is "YES", the processing proceeds to a step 188 wherein the register ACH stores the CH number X whose channel has been already assigned.

After executing the step 186 or 188, the processing proceeds to a step 190 wherein the musical instrument code of register PDCODE is written into the register ICODE (ACH), while the roll designating information (0) is written into the register RLSW. Then, the processing proceeds to a step 192.

Similar to the step 158 shown in FIG. 10, in the step 192, the truncate value corresponding to the value of register ICODE(ACH) is read from the truncate value memory, and the read truncate value is inputted to the truncate counter TCTR(ACH). Then, the processing proceeds to a step 194.

Similar to the step 160 shown in FIG. 10, in the step 194, the volume value corresponding to the values of register ICODE(ACH) and flag RLFLG(ACH) is read from the volume value memory, and the read volume value is stored in the register VLM(ACH). Then, the processing proceeds to a step 196.

Similar to the step 162 shown in FIG. 10, in the step 196, the key-on information KON plus the values of registers ACH, ICODE(ACH) and VLM(ACH) are outputted to the rhythm tone generator 30. Thus, the rhythm tone signal RTS corresponding to the value of register ICODE(ACH) is generated from the channel corresponding to the value of register ACH, wherein this rhythm tone signal RTS has the attack level corresponding to the value of register VLM (ACH). Thereafter, the processing returns to the main routine shown in FIG. 6.

[M] TEMPO CLOCK INTERRUPT PROCESS (FIG. 13)

Figure 13A:
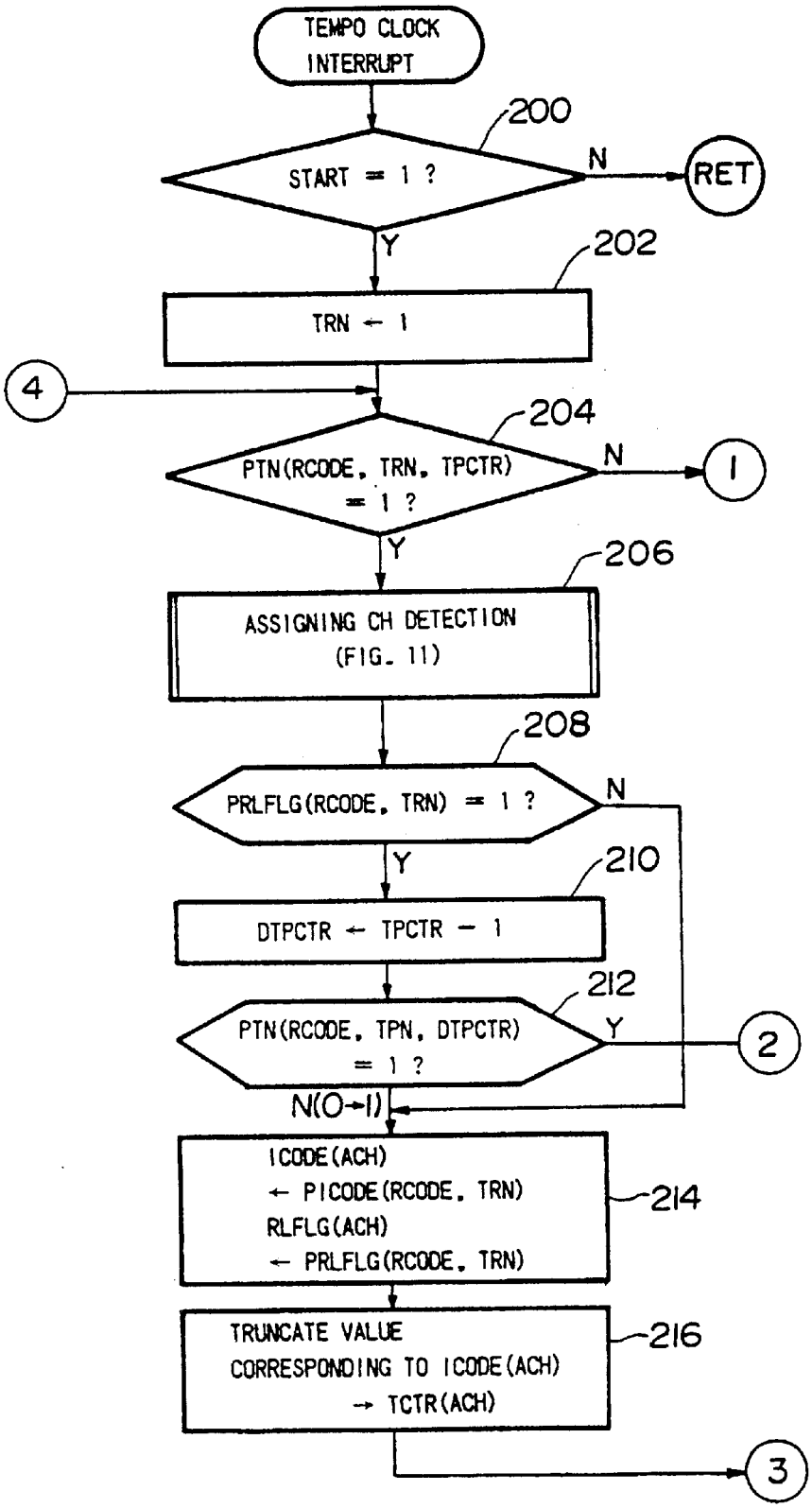
FIGS. 13A and 13B are flowcharts showing a tempo clock interrupt process.
Figure 13B:
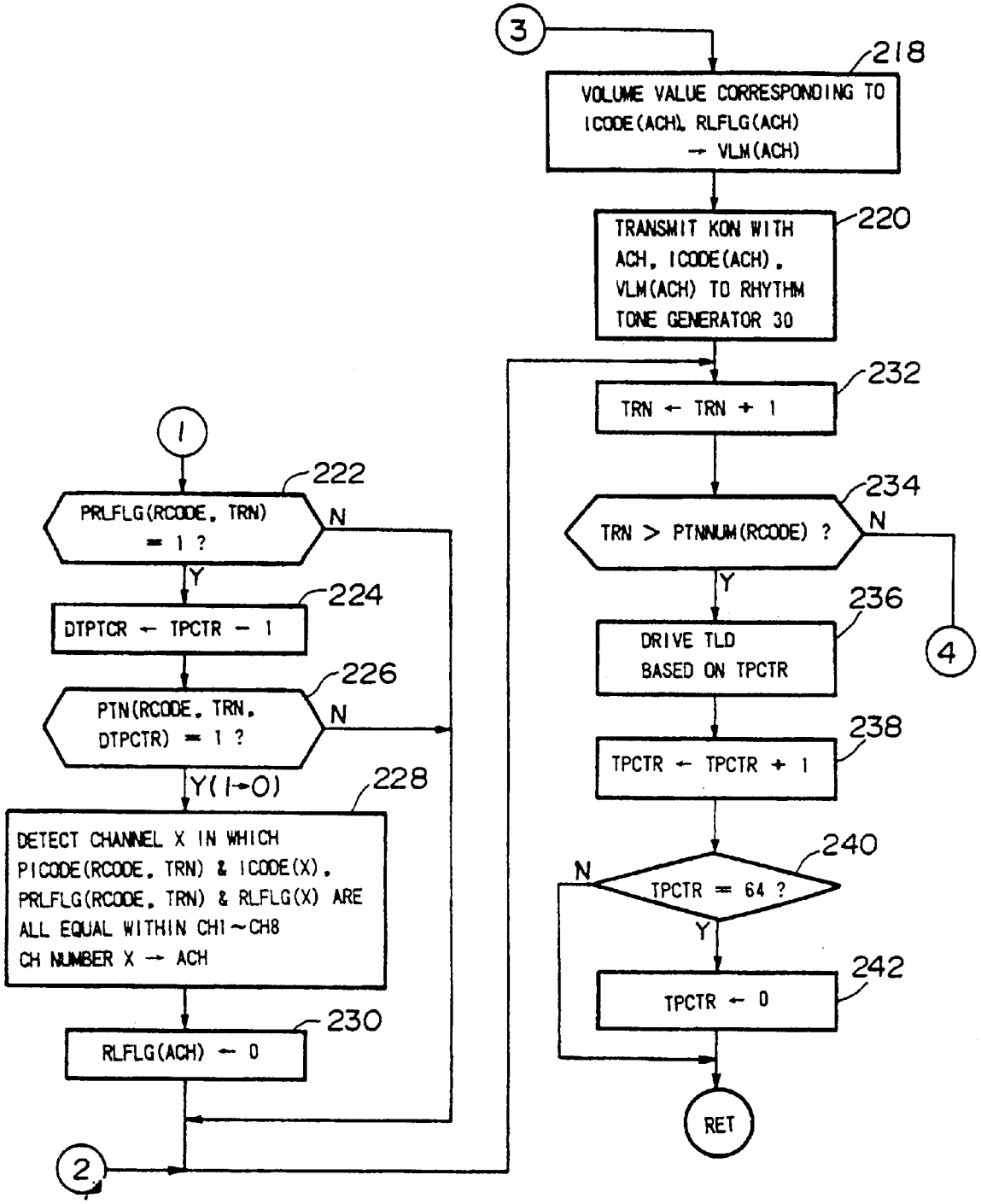

FIGS. 13A and 13B are flowcharts both showing the tempo clock interrupt process, wherein this interrupt process is started by each clock pulse of the tempo clock signal TCL.

In a step 200, it is judged whether the value of flag START is equal to "1" (indicating the rhythm running) or not. If the judgement of this step 200 is "NO", the generation of rhythm tone must be stopped, and then the processing returns to the main routine.

If the judgement result of step 200 is "YES", the processing proceeds to a step 201 wherein the value "1" is set to the register TRN. As described above, if the value of flag START is maintained at "1", the processes after a step 202 can be executed in both of the program mode and play mode. After executing the step 202, the processing proceeds to a step 204.

In this case, the storing cell PTN(RCODE, TRN, TPCTR) is designated by the rhythm code (i.e., the selected rhythm) of register RCODE, the track number of register TRN and the count value of tempo counter TPCTR. Then, in the step 204, it is judged whether the storing cell PTN(RCODE, TRN, TPCTR) takes the value "1" (indicating the timing for generating tones) or not. If the judgement result of this step 204 is "YES", the processing proceeds to a step 206.

As described before in conjunction with FIG. 11, the assigning channel detection subroutine process is executed in the step 206. More specifically, the channel to which the rhythm tone kind to be generated must be assigned is detected, and the CH number of such detected channel is stored in the register ACH. Then, the processing proceeds to a step 208.

In this case, the storing area PRLFLG(RCODE, TRN) is designated by the rhythm code of register RCODE and the track number of register TRN. In the step 208, it is judged whether the value of this storing area PRLFLG(RCODE, TRN) takes the value "1" (indicating the presence of roll designation) or not. If the judgement result of this step 208 is "YES", the processing proceeds to a step 210.

In the step 210, the register DTPCTR stores the value which is obtained by subtracting the value "1" from the count value of tempo counter TPCTR. This value means the preceding tempo count value. If the subtracting result becomes equal to "−1", the value "63" is inputted into the register DTPCTR. After executing the step 210, the processing proceeds to a step 212.

Figures 14, 15:
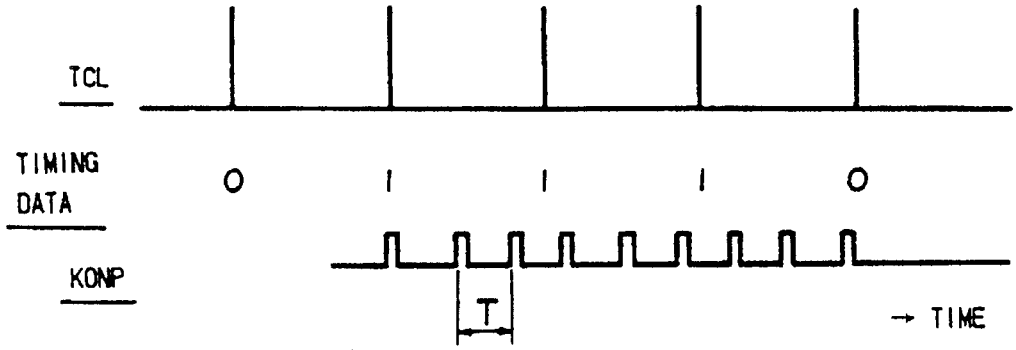
FIG. 14 shows signal waveforms for explaining a roll tone-generation operation.
FIG. 15 is a drawing for explaining a tempo indicating operation.

In the step 212, it is judged whether the value of storing cell PTN(RCODE, TRN, DTPCTR) corresponding to the preceding tempo count value is equal to "1" (indicating the tone-generation timing) or not. If the judgement result of this step 212 is "NO", it can be said that the value of timing data of the selected rhythm varies from "0" to "1" as shown in FIG. 14.

When the process of step 212 is completed or when the judgement result of step 208 is "NO" (which means the normal tone without the roll tone designation), the processing proceeds to a step 214. In this step 214, the musical instrument number of storing area PICODE(RCODE, TRN) is set to the register ICODE(ACH), while the roll designating information of storing area PRLFLG(RCODE, TRN) is set to the flag RLFLG(ACH). When the processing proceeds to the step 214 via the step 212, the value "1" is set to the flag RLFLG(ACH).

Next, similar to the step 158 shown in FIG. 10, the truncate value corresponding to the value of register ICODE (ACH) is read from the truncate value memory and such read truncate value is inputted into the truncate counter TCTR(ACH) in the step 216. Then, the processing proceeds to a step 218.

Then, similar to the step 160 shown in FIG. 10, the volume value corresponding to the values of register ICODE (ACH) and flag RLFLG(ACH) is read from the volume value memory and then such read volume value is inputted into the register VLM(ACH) in the step 218. Thereafter, the processing proceeds to a step 220.

Similar to the step 162 shown in FIG. 10, the key-on information KON plus the values of registers ACH, ICODE (ACH) and VLM(ACH) are outputted to the rhythm tone generator 30 in the step 220. Thus, the rhythm tone signal RTS corresponding to the value of register ICODE(ACH) is generated from the channel corresponding to the value of register ACH, wherein this rhythm tone signal RTS has the attack level corresponding to the value of register VLM (ACH).

When the processing directly proceeds to the step 220 via the step 212, the key-on pulse KONP is generated in synchronism with the clock pulse of tempo clock signal TCL when the value of timing data varies from "0" to "1" as shown in FIG. 14. In response to this key-on pulse KONP, the first tone is generated in the roll tone generation. Thereafter, the tones in the roll tone generation are succeedingly generated by the roll timer interrupt process shown in FIG. 16, independent from the tempo clock signal TCL. A cycle period T of succeedingly generating these tones corresponds to that of generating the roll clock signal RCL, which takes several tens milli-second, for example.

When the process of step 220 is completed or when the judgement result of step 212 is "YES", the processing proceeds to a step 232. The reason why the processing proceeds to the step 232 when the judgement result of step 212 is "YES" is that there is no need to execute the tone-generation process in the steps 214 to 220 because the value of timing data is remained at "1" so that the roll tone-generation is performed.

Meanwhile, if the judgement result of step 204 is "NO" (which means it is not the tone-generation timing), the processing proceeds to a step 222. Similar to the step 208, the step 222 judges whether the value of storing area PRLFLG(RCODE, TRN) takes the value "1" or not. If the judgement result of this step 222 is "NO", there is no need to execute the process of stopping the roll tone-generation, so that the processing proceeds to the step 232.

If the judgement result of this step 222 is "YES", the processing proceeds to a step 224 wherein the preceding tempo count value is set to the register DTPCTR as similar to the step 210. Then, the processing proceeds to a step 226.

Similar to the step 212, it is judged whether the storing cell PTN(RCODE, TRN, DTPCTR) takes the value "1" or not in the step 226. If the judgement result of this step 226 is "NO", the value "0" is continued in the timing data, so that the processing proceeds to the step 232.

When the judgement result of step 226 is "YES", the value of timing data varies from "1" to "0" as shown in FIG. 14. Then, the processing proceeds to a step 228.

Similar to the step 170 shown in FIG. 11, the channel to which the roll tone has been already assigned is detected, and its CH number is inputted into the register ACH in the step 228. Then, the processing proceeds to a step 230.

In this step 230, the value "0" is set to the flag RLFLG (ACH). As a result, the roll tone-generation must be stopped after the clock pulse of tempo clock signal TCL at the timing when the value of timing data varies from "1" to "0". After executing the step 230, the processing proceeds to the step 232.

In the step 232, the value of register TRN is incremented by one. Then, the processing proceeds to a step 234 wherein it is judged whether or not the value of register TRN is larger than the track number of storing area PTNNUM(RCODE) corresponding to the rhythm code of register RCODE. If the judgement result of this step 234 is "NO", the processing returns to the step 204, whereby the processes as described heretofore are repeatedly executed until TRN>PTNNUM (RCODE). For example, in the case where the rhythm 1 is selected in the rhythm pattern memory, PTNNUM(1)=16, so that the above-mentioned processes are repeatedly executed by sixteen times.

In case of TRN>PTNNUM(RCODE), the judgement result of step 234 turns to "YES", and then the processing proceeds to a step 236. In this step 236, the tempo indicators TLD are driven based on the count value of tempo counter TPCTR. More specifically, four indicators TLD1 to TLD4 (shown in FIG. 1) are controlled to be lighted on and off as shown in FIG. 15 in response the state where the count value of tempo counter TPCTR coincides with any one of the values "0", "8", "16", ..., "48" and "56". As a result, the tempo indication can be executed in response to the set tempo. After executing the step 236, the processing proceeds to a step 238.

In the step 238, the value of tempo counter TPCTR is incremented by one. Then, the processing proceeds to a step 240 wherein it is judged whether the value of tempo counter TPCTR is equal to "64" (indicating the end of two bars) or not. If the judgement result of this step 240 is "NO", the processing returns to the main routine shown in FIG. 6.

On the contrary, if the judgement result of step 240 is "YES", the processing proceeds to a step 242 wherein the value "0" is set to the tempo counter TPCTR, then the processing returns to the main routine. Therefore, it is possible to continue the automatic rhythm performance by repeatedly using the rhythm pattern of two bars.

[N] ROLL TIMER INTERRUPT PROCESS (FIG. 16)

Figure 16:
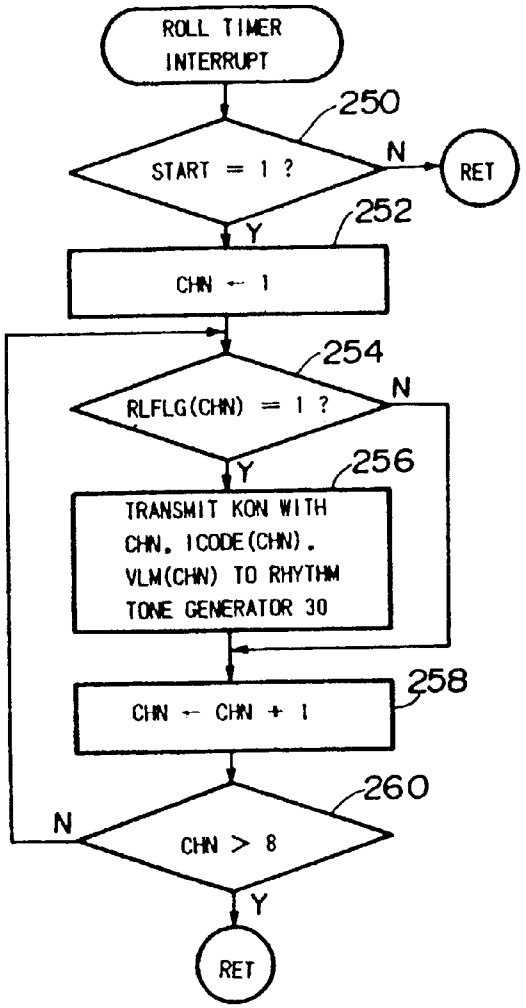
FIG. 16 is a flowchart showing a roll timer interrupt process.

FIG. 16 shows the roll timer interrupt process, wherein this interrupt process is started by each clock pulse of roll clock signal RCL.

In a first step 250 shown in FIG. 16, it is judged whether the value of flag START is equal to "1" or not. If the judgement result of this step 250 is "NO", the processing returns to the main routine shown in FIG. 6.

On the contrary, if the judgement result of step 250 is "YES", the processing proceeds to a step 252 wherein the value "1" is set to the register CHN. Thus, the processes after the step 252 can be executed in both of the program mode and play mode as long as the value of flag START remains at "1". After executing the step 252, the processing proceeds to a step 254.

In the step 254, it is judged whether the value of flag RLFLG(CHN) corresponding to the channel number of register CHN takes the value "1" (indicating the presence of roll designation) or not. If the judgement result of this step 254 is "YES", the processing proceeds to a step 256.

As similar to the step 162 shown in FIG. 10, the channel number of register CHN (which indicates the presence of roll designation), the musical instrument code of register ICODE(CHN), the volume value of register VLM(CHN) and the key-on information KON are outputted to the rhythm tone generator 30. Thus, the rhythm tone signal RTS corresponding to the value of register ICODE (CHN) is generated from the corresponding channel, wherein this rhythm tone signal RTS has the attack level corresponding to the value of register VLM(CHN) (which is about half level of the normal tone).

When the process of step 256 is completed or when the judgement result of step 254 is "NO" (which means the absence of roll designation), the processing proceeds to a step 258.

In the step 258, the value of register CHN is incremented by one. Then, the processing proceeds to a step 260 wherein it is judged whether the value of register CHN is larger than the channel number "8" or not. If the judgement result of this step 258 is "NO", the processing returns to the step 254, whereby the above-mentioned processes are repeatedly executed until the value of register CHN exceeds over "8". Thus, it is searched whether the roll designation is present or absent in each channel. If there is the roll designation existed, the rhythm tone is generated.

In case of CHN>"8", the judgement result of step 260 turns to "YES", then the processing returns to the main routine.

According the above-mentioned roll timer interrupt process, the roll timer clock signal RCL independent from the tempo clock signal TCL is generated. Hence, even if the tempo is changed, the time interval between the times of generating the roll tones is not changed. In addition, it is possible to arbitrarily vary and set the such time interval of roll tone, regardless of the tempo.

[O] TRUNCATE TIMER INTERRUPT PROCESS (FIG. 17)

FIG. 17 shows the truncate timer interrupt process, wherein this interrupt process is started by each clock pulse of the truncate clock signal KCL.

In a first step 270 shown in FIG. 17, it is judged whether the value of flag START is equal to "1" or not. If the judgement result of this step 270 is "NO", the processing returns to the main routine.

If the judgement result of step 270 is "YES", the processing proceeds to a step 272 wherein the value "1" is set to the register CHN. As described above, the processes after the step 272 can be executed in both of the program mode and play mode as long as START=1. After executing the step 272, the processing proceeds to a step 274.

In the step 274, it is judged whether the value of truncate timer TCTR(CHN) is "0" (indicating the end of tone-generation) or not. If the judgement result of this step 274 is "NO", the processing proceeds to a step 276 wherein the truncate timer TCTR(CHN) is set with the value which is obtained by subtracting the value "1" from the present value of truncate timer TCTR(CHN).

When the process of step 276 is completed or when the judgement result of step 274 is "YES", the processing proceeds to a step 278.

In the step 278, the value of register CHN is incremented by one. Then, the processing proceeds to a step 280 wherein it is judged whether the value of register CHN is larger than "8" or not. If the judgement result of this step 280 is "NO", the processing returns to the step 274, wherein the above-mentioned processes are repeatedly executed until the value of register CHN exceeds over "8". As described heretofore, it is searched whether TCTR(CHN)=0 or not in each channel. If not, the value of truncate timer TCTR(CHN) is decremented by one.

If the value of register CHN exceeds over "8", the judgement result of step 280 turns to "YES", so that the processing returns to the main routine.

The truncate method is not limited to as described above, hence, it is possible to employ the following truncate methods:

(1) The value of truncate timer is decremented by one in each tempo clock interrupt, where the time until this value is decreased to "0" depends on the tempo;

(2) The value of truncate timer is decremented by one when new tone-generation assignment is occurred; and (3) The value of truncate timer is added with the value "1" in each interrupt timing so that new rhythm tone kind is assigned to the channel having the maximum addition result, wherein the truncate value corresponding to the rhythm tone kind whose attenuating time is relatively longer is set relatively smaller.

[P] MODIFIED EXAMPLES

The present invention is not limited to the present embodiment as described heretofore, hence, it is possible to re-design the present embodiment to the following modified examples.

(1) The operation of present embodiment is controlled by software, however, it is possible to control such operation by use of specific hardware.

(2) The rhythm tone generator 30 works according to the pulse code modulation (PCM) method. However, it is possible to employ the frequency modulation (FM) method. In addition, the rhythm tone generator 30 use plural channels by the time division system. However, it is possible to use plural channels in parallel.

(3) The present embodiment provides the keyboard. However, it is possible to omit the keyboard to thereby redesign the electronic musical instrument according to the present invention into the specific rhythm performance apparatus.

(4) The channel assigning method is based on the latter-first-method in the present embodiment. However, it is possible to employ former-first-method wherein new rhythm tone kind is not assigned to any channels when all channels are occupied by respective rhythm tone kinds.

(5) The present embodiment transmits the musical instrument code to the rhythm tone generator 30. However, it is possible to transmit necessary musical tone parameter information (e.g., parameter information for FM tone source) in order to obtain the desirable musical instrument tone.

(6) The present embodiment employs the real-time input method wherein the tempo is indicating, the rhythm is running and the rhythm pattern is written in simultaneously. However, it is possible to employ the step input method as described in Japanese Utility Model Laid-Open Publication No. 60-125699. More specifically, the rhythm pattern is written in by designating the timing by use of the specific timing designating switch.

(7) The present embodiment provides the specific pad switch. However, it is possible to assign the plural rhythm tones to the plural keys in the keyboard in the program mode. In this case, the rhythm tone is inputted by the timing of depressing the key, which means that the keys of keyboard are used as the input switches.

(8) The present embodiment simultaneously designate the musical instrument and its tone-generation timing by use of the pad switches. However, it is possible to use different switches for respective designations.

(9) The present embodiment can generate the tones in the program mode, however, it is possible to omit generating the tones. In addition, the present invention is not limited to use the programmed rhythm pattern as the automatic rhythm performance.

(10) It is possible to employ event storing method as the method of storing timing data. In this case, in order to compress the data, each track must store an event kind and time information among events.

(11) It is possible to adequately edit or partially erase the programmed rhythm pattern. For example, when it is detected that an erase switch and desirable pad switch are simultaneously depressed, it is possible to clear the information stored in the track assigning with the musical instrument corresponding to such desirable pad switch.

(12) The present embodiment provides one ROM 18 for storing programs. However, it is possible to provides plural memories for storing programs.

(13) The functions of pad switches and roll designating switch can be assigned to any keys of keyboard or other switches.

(14) It is possible to automatically generate the roll tone in the play mode in addition to the program mode when the pad switch and roll designating switch are simultaneously depressed.

(15) It is not preferable to generate the roll tones in some rhythm tone kinds. Hence, when such rhythm tone kind is designated, it is possible to automatically inhibit generating its roll tone.

(16) The function of roll timer 24 can be assigned to the tempo timer and the like.

(17) The number of pad switches can be limited to one.

(18) It is possible to automatically and simultaneously execute the tone-generation designation and roll designation, regardless of the player's operation. In this case, the code indicative of such execution command can be inserted into any rhythm pattern.

(19) The present embodiment generate the roll tone when the roll designation is continuously done. However, it is possible to generate the roll tone when it is detected that the roll designating switch is instantaneously operated. In this case, the register RLSW is set in the on-event of roll designating switch, and then this register RLSW is reset in the next on-event.

The above is the description of a preferred embodiment and its modified examples. This invention may be practiced or embodied in still other ways without departing from the spirit or essential character thereof as described heretofore. Therefore, the preferred embodiment described herein is illustrative and not restrictive, the scope of the invention being indicated by the appended claims and all variations which come within the meaning of the claims are intended to be embraced therein.

What is claimed is:

1. An electronic musical instrument having a rhythm performance function, comprising:

(a) tone source means having plural rhythm tone source channels, said tone source means storing plural rhythm tone color kinds, each of which can be designated by a player, said tone source means thereby generating a rhythm tone color kind from each rhythm tone source channel;

(b) generating means for generating rhythm tone color kind designating information by which at least one rhythm tone color kind to be performed is designated at each one of plural tone-generation timings; and (c) assigning means for assigning said rhythm tone color kind designating information to one of said plural rhythm tone source channels so that a desired rhythm tone color kind is designated in an assigned rhythm tone source channel each time said generating means generates said rhythm tone color kind designating information, *wherein when all of said plural rhythm tone source channels are assigned rhythm tone color kind designation information and a new rhythm tone color kind designation information requires assigning, said assigning means further detects a fading state of each rhythm tone signal and assigns said new rhythm tone color kind designation information to one of said plural rhythm tone source channels based on results of said detection.*

2. An electronic musical instrument having a rhythm performance function, comprising:

(a) storing means having plural storing tracks;

(b) selecting means for arbitrarily selecting one of plural rhythm tone color kinds for rhythm patterns to be programmed and generating rhythm tone color kind designating information by which a selected rhythm tone color kind is designated;

(c) designating means for designating a tone-generation timing concerning said rhythm tone color kind selected by said selecting means and generating timing information indicative of a designated timing; and (d) writing means for detecting a storing track to which said rhythm tone color kind designating information already has been assigned to thereby write corresponding timing information to a detected storing track each time said selecting means generates said rhythm tone color kind designating information, said writing means assigning said rhythm tone color kind designating information to a non-assigned storing track to thereby write corresponding timing information to the non-assigned storing track when said rhythm tone color kind designating information is not assigned to any of said plural storing tracks.

3. An electronic musical instrument having a rhythm performance function, comprising:

(a) tone source means having plural musical tone generating channels, said tone source means generating a musical tone signal corresponding to at least one of plural musical tone color kinds by each musical tone generating channel;

(b) designating means for generating musical tone color kind designating information by which the musical tone color kind to be generated is designated;

(c) assigning means for assigning said musical tone color kind designating information to at least one of said plural musical tone generating channels so that a musical tone color kind corresponding to said musical tone color kind designating information is designated in an assigned musical tone generating channel each time said designating means generates said musical tone color kind designating information;

(d) storing for storing truncate control information corresponding to a tone-generation period of each musical tone color kind;

(e) measuring means for measuring a tone-generation remaining time of a musical tone which is being generated based on said truncate control information for each musical tone generating channel to which said musical tone color kind designating information is assigned by said assigning means; and (f) control means for controlling channel assignment of said assigning means based on the tone-generating remaining time which is measured by said measuring means, whereby new musical tone color kind designating information is assigned to a musical tone generating channel which has the shortest tone-generation remaining time of said plural musical tone generating channels.

4. An electronic musical instrument having a rhythm performance function, comprising:

tone-generation designating means for generating tone-generation designating information with respect to a specific rhythm tone color kind;

(b) roll designating means for generating roll designating information;

(c) rhythm tone source means for generating a rhythm tone signal corresponding to said rhythm tone color kind; and (d) control means for controlling said rhythm tone source means based on said tone-generation designating information and said roll designating information, whereby said rhythm tone signal is generated once each time only said tone-generation designating information is generated, while said rhythm tone signal is generated continuously in accordance with each of plural predetermined time intervals when both of said tone-generation designating information and said roll designating information simultaneously are generated.

5. An electronic musical instrument having a rhythm performance function, and capable of being used to drive an external sound system, comprising:

(a) memory means for storing at least plural rhythm tone color kinds;

(b) rhythm selecting means for selecting one of said plural rhythm tone color kinds to thereby generate rhythm tone color kind designating information representative of a selected rhythm tone color kind;

(c) rhythm tone generating means for generating a rhythm tone signal corresponding to a selected rhythm tone color kind, said rhythm tone generating means having plural channels; and (d) assigning means for assigning said rhythm tone color kind designating information to one of said plural channels at each one of plural tone-generation timings, so that said rhythm tone generating means generates a rhythm tone signal corresponding to a selected rhythm tone color kind, said rhythm tone signal driving said external sound system so that rhythm tones of said plural rhythm tone color kinds can be generated on a time division basis, *wherein when all of said plural channels are assigned rhythm tone color kind designation information and a new rhythm tone color kind designation information requires assigning, said assigning means further detects a fading state of each rhythm tone signal and assigns said new rhythm tone color kind designation information to one of said plural channels based on results of said detection.*

6. An electronic musical instrument according to claim 5 wherein said memory means further stores truncate information and volume information for each musical instrument to be performed, so that a period of generating a musical tone is controlled in response to said truncate information and a tone volume thereof is controlled in response to said volume information for each musical instrument.

7. An electronic musical instrument according to claim 5 wherein said rhythm tone generating means further comprises:

(a) storing means for storing data representative of the rhythm tone color kind, key-on information, and volume information for each channel;

a rhythm tone waveform memory for pre-storing plural kinds of rhythm tone waveforms;

(c) an envelope generator for generating envelope waveform data in response to said key-on information, wherein an attack level of envelope indicated by said envelope waveform data is controlled in response to said volume information; and (d) a multiplier for multiplying data representative of the rhythm tone waveform outputted from said rhythm tone waveform memory and said envelope waveform data to thereby output a digital musical tone signal, whereby said rhythm tone signal is generated based on said digital musical tone signal for each channel.

8. An electronic musical instrument according to claim 6 wherein said volume information is predetermined such that a tone volume of the roll of rhythm tones is less than that of a non-roll rhythm tone.

9. An electronic musical instrument having a rhythm performance function, comprising:

(a) memory means for storing at least plural rhythm tone color kinds;

(b) a panel unit providing at least rhythm selecting switches so that one of said plural rhythm tone color kinds can be freely selected by operating one of said rhythm selecting switches;

(c) a keyboard on which a main musical performance can be performed;

(d) a rhythm tone generator having plural channels, one of which is assigned with a selected rhythm tone color kind at each one of plural tone-generation timings, said rhythm tone generator generating a rhythm tone signal corresponding to said selected rhythm tone color kind for each channel;

(e) a keyboard tone generator for generating a keyboard musical tone signal based on performance of said keyboard; and (f) means for generating a keyboard musical tone and a rhythm tone respectively based on said keyboard musical tone signal and said rhythm tone signal.

10. An electronic musical instrument according to claim 9, further comprising:

(a) storing means for storing information relating to rhythm tone color kinds and rhythm patterns; and (b) mode selecting means for alternatively selecting one of a play mode and a program mode, whereby the rhythm tones corresponding to rhythm tone color kinds and rhythm patterns are programmed and stored into said storing means in said program mode so that programmed rhythm tones are to be generated in said play mode.

11. An electronic musical instrument according to claim 9 further comprising roll designating means for designating generation of a roll of rhythm tones.

12. An electronic musical instrument according to claim 9 further comprising timer means for generating a clock signal, whereby a remaining period of generating at least one of said keyboard musical tone and said rhythm tone is counted based on said clock signal.

13. An electronic musical instrument according to claim 9 further comprising tempo means for controlling a tempo of at least one of said keyboard musical tone and said rhythm tone to be generated.

*14. An electronic musical instrument having a rhythm performance function, comprising:*

*(a) tone source means having plural rhythm tone source channels, said tone source means storing plural rhythm tone color kinds, each of which can be designated by a player, said tone source means thereby generating a rhythm tone color kind from each rhythm tone source channel;*

*(b) generating means for generating rhythm tone color kind designating information by which at least one rhythm tone color kind to be performed is designated at each one of plural tone-generation timings; and*

*(c) assigning means for assigning said rhythm tone color kind designating information to one of said plural rhythm tone source channels so that a desired rhythm tone color kind is designated in an assigned rhythm tone source channel each time said generating means generates said rhythm tone color kind designating information, said assigning means further assigning volume control information to one of said plural rhythm tone source channels corresponding to said assigned rhythm tone color kind designating information.*

*15. An electronic musical instrument having a rhythm performance function, comprising:*

*(a) tone source means having plural rhythm tone source channels, said tone source means storing plural rhythm tone color kinds, each of which can be designated by a player, said tone source means thereby generating a rhythm tone color kind from each rhythm tone source channel;*

*(b) generating means for generating rhythm tone color kind designating information by which at least one rhythm tone color kind to be performed is designated at each one of plural tone-generation timings; and*

*(c) assigning means for assigning said rhythm tone color kind designating information to one of said plural rhythm tone source channels so that a desired rhythm tone color kind is designated in an assigned rhythm tone source channel each time said generating means generates said rhythm tone color kind designating information, wherein if a rhythm tone source channel corresponds to a rhythm tone signal having the same rhythm tone color kind as said generated rhythm tone color kind designating information, said assigning means assigns said generated rhythm tone color kind*

*designating information to said rhythm tone source channel having said same rhythm tone color kind.*

*16. An electronic musical instrument having a rhythm performance function, and capable of being used to drive an external sound system, comprising:*

(*a*) *memory means for storing at least plural rhythm tone color kinds;*

(*b*) *rhythm selecting means for selecting one of said plural rhythm tone color kinds to thereby generate rhythm tone color kind designating information representative of a selected rhythm tone color kind;*

(*c*) *rhythm tone generating means for generating a rhythm tone signal corresponding to a selected rhythm tone color kind, said rhythm tone generating means having plural channels; and*

(*d*) *assigning means for assigning said rhythm tone color kind designating information to one of said plural channels at each one of plural tone-generation timings, so that said rhythm tone generating means generates a rhythm tone signal corresponding to a selected rhythm tone color kind, said rhythm tone signal driving said external sound system so that rhythm tones of said plural rhythm tone color kinds can be generated on a time division basis, said assigning means further assigning volume control information to one of said plural channels corresponding to said assigned rhythm tone color kind designating information.*

*17. An electronic musical instrument having a rhythm performance function, and capable of being used to drive an external sound system, comprising:*

(*a*) *memory means for storing at least plural rhythm tone color kinds;*

(*b*) *rhythm selecting means for selecting one of said plural rhythm tone color kinds to thereby generate rhythm tone color kind designating information representative of a selected rhythm tone color kind;*

(*c*) *rhythm tone generating means for generating a rhythm tone signal corresponding to a selected rhythm tone color kind, said rhythm tone generating means having plural channels; and*

(*d*) *assigning means for assigning said rhythm tone color kind designating information to one of said plural channels at each one of plural tone-generation timings, so that said rhythm tone generating means generates a rhythm tone signal corresponding to a selected rhythm tone color kind, said rhythm tone signal driving said external sound system so that rhythm tones of said plural rhythm tone color kinds can be generated on a time division basis, wherein if one of said plural channels contains a rhythm tone signal corresponding to the same rhythm tone color kind as said rhythm tone color kind designating information to be assigned by said assigning means, said assigning means assigns said generated rhythm tone color kind designating information to said rhythm tone source channel having said same rhythm tone color kind.*

*18. An electronic musical instrument having a rhythm performance function, comprising:*

(*a*) *a memory device, comprised of at least one of a ROM and a RAM, having plural rhythm tone source channels, said memory device storing plural rhythm tone color kinds, each of which can be designated by a player, said memory device thereby generating a rhythm tone color kind from each rhythm tone source channel;*

(*b*) *a plurality of switches adapted to generate rhythm tone color kind designating information by which at least one rhythm tone color kind to be performed is designated at each one of plural tone-generation timings; and*

(*c*) *a CPU adapted to execute a program, said program comprises the step of assigning said rhythm tone color kind designating information to one of said plural rhythm tone source channels so that a desired rhythm tone color kind is designated in an assigned rhythm tone source channel each time said plurality of switches generate said rhythm tone color kind designating information, wherein when all of said plural rhythm tone source channels are assigned rhythm tone color kind designation information and a new rhythm tone color kind designation information requires assigning, said program further comprises the step of detecting a fading state of each rhythm tone signal and assigning said new rhythm tone color kind designation information to one of said plural rhythm tone source channels based on results of said detection.*

*19. The electronic musical instrument of claim 18, wherein said program further comprises the step of assigning volume control information to one of said plural rhythm tone source channels corresponding to said assigned rhythm tone color kind designating information.*

*20. The electronic musical instrument of claim 18, wherein if a rhythm tone source channel corresponds to a rhythm tone signal having the same rhythm tone color kind as said generated rhythm tone color kind designating information, said program further comprises the step of assigning said generated rhythm tone color kind designating information to said rhythm tone source channel having said same rhythm tone color kind.*

*21. An electronic musical instrument having a rhythm performance function, and capable of being used to drive an external sound system, comprising:*

(*a*) *a memory device, comprised of at least one of a ROM and a RAM, for storing at least plural rhythm tone color kinds;*

(*b*) *a plurality of switches adapted to select one of said plural rhythm tone color kinds to thereby generate rhythm tone color kind designating information representative of a selected rhythm tone color kind;*

(*c*) *a rhythm tone generator adapted to generate a rhythm tone signal corresponding to a selected rhythm tone color kind, said rhythm tone generator having plural channels; and*

(*d*) *a CPU adapted to execute a program, said program comprises the step of assigning said rhythm tone color kind designating information to one of said plural channels at each one of plural tone-generation timings, so that said rhythm tone generator generates a rhythm tone signal corresponding to a selected rhythm tone color kind, said rhythm tone signal driving said external sound system so that rhythm tones of said plural rhythm tone color kinds can be generated on a time division basis, wherein when all of said plural channels are assigned rhythm tone color kind designation information and a new rhythm tone color kind designation information requires assigning, said program further comprises the step of detecting a fading state of each rhythm tone signal and assigning said new rhythm tone color kind designation information to one of said plural channels based on results of said detection.*

*22. The electronic musical instrument of claim 21, wherein said program further comprises the step of assigning volume control information to one of said plural chan-*

*nels corresponding to said assigned rhythm tone color kind designating information.*

*23. The electronic musical instrument of claim 21, wherein if one of said plural channels contains a rhythm tone signal corresponding to the same rhythm tone color kind as said rhythm tone color kind designating information to be assigned, said program further comprises the step of assigning said generated rhythm tone color kind designating information to said rhythm tone source channel having said same rhythm tone color kind.*

* * * * *